United States Patent
Rockwell et al.

(10) Patent No.: US 9,535,211 B2
(45) Date of Patent: Jan. 3, 2017

(54) METHOD AND APPARATUS FOR FIBER DELIVERY OF HIGH POWER LASER BEAMS

(75) Inventors: David A. Rockwell, Culver City, CA (US); James Randolph Mulroy, Tucson, AZ (US); Vladimir V. Shkunov, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 825 days.

(21) Appl. No.: 13/308,789

(22) Filed: Dec. 1, 2011

(65) Prior Publication Data

US 2013/0142481 A1  Jun. 6, 2013

(51) Int. Cl.
*G02B 6/42* (2006.01)
*G02B 6/02* (2006.01)
*G02B 6/32* (2006.01)

(52) U.S. Cl.
CPC ....... *G02B 6/02009* (2013.01); *G02B 6/02138* (2013.01); *G02B 6/32* (2013.01); *G02B 6/4208* (2013.01); *G02B 2006/02161* (2013.01)

(58) Field of Classification Search
CPC ................. G02B 2006/02161; G02B 6/02138; G02B 6/4208
See application file for complete search history.

(56) References Cited

U.S. PATENT DOCUMENTS

| | | |
|---|---|---|
| 4,000,416 A | 12/1976 | Goell |
| 4,103,179 A | 7/1978 | Schmidt |
| 4,295,738 A | 10/1981 | Meltz et al. |
| 4,324,491 A | 4/1982 | Hueber |
| 4,538,274 A | 8/1985 | George |
| 4,618,783 A | 10/1986 | Pradere et al. |
| 4,821,272 A | 4/1989 | Bruesselbach et al. |
| 5,062,112 A | 10/1991 | Buchman et al. |
| 5,090,016 A | 2/1992 | Dewhirst et al. |
| 5,153,887 A | 10/1992 | Krapchev |
| 5,208,699 A | 5/1993 | Rockwell et al. |
| 5,418,880 A | 5/1995 | Lewis et al. |
| 5,457,756 A | 10/1995 | Hartl et al. |
| 5,561,726 A | 10/1996 | Yao |

(Continued)

FOREIGN PATENT DOCUMENTS

| | | |
|---|---|---|
| EP | 1 081 813 A2 | 3/2001 |
| JP | 1-92936 | 4/1989 |
| WO | WO 2011/146407 A2 | 11/2011 |

OTHER PUBLICATIONS

Notification of transmittal of the International Search Report and the Written Opinion of the International Searching Authority, or the Declaration dated Feb. 15, 2011 in connection with International Patent Application No. PCT/US2012/069279.

(Continued)

*Primary Examiner* — Thomas A Hollweg
*Assistant Examiner* — Mary A El Shammaa

(57) ABSTRACT

In various embodiments, an optical fiber includes a core having a relatively large area selected so as to raise a threshold of stimulated Raman scattering or stimulated Brillouin scattering, or both, the core having a high aspect ratio elongated cross-section and having a first refractive index. The core is narrower in a fast-axis direction and wider in a slow-axis direction, such that the fiber is mechanically flexible in the fast-axis direction and is mechanically rigid in the slow-axis direction.

54 Claims, 10 Drawing Sheets

(56) References Cited

U.S. PATENT DOCUMENTS

| | | | |
|---|---|---|---|
| 5,566,196 | A | 10/1996 | Scifres |
| 5,673,281 | A | 9/1997 | Byer |
| 5,689,578 | A | 11/1997 | Yamauchi et al. |
| 5,701,376 | A | 12/1997 | Shirasaki |
| 5,734,773 | A | 3/1998 | Teshima et al. |
| 5,848,215 | A | 12/1998 | Akasaka et al. |
| 5,851,259 | A | 12/1998 | Clayton et al. |
| 6,529,464 | B2 | 3/2003 | Wilde et al. |
| 6,542,683 | B1 | 4/2003 | Evans et al. |
| 6,580,860 | B1 | 6/2003 | Varner |
| 6,751,240 | B2 | 6/2004 | Arisawa et al. |
| 6,772,611 | B2 * | 8/2004 | Kliner et al. ............ 65/377 |
| 6,904,219 | B1 * | 6/2005 | Fermann ............ 385/130 |
| 6,947,652 | B2 | 9/2005 | Varner et al. |
| 6,961,171 | B2 | 11/2005 | Byren et al. |
| 6,965,469 | B2 | 11/2005 | Avizonis et al. |
| 7,010,195 | B2 | 3/2006 | Westbrook |
| 7,042,631 | B2 | 5/2006 | Smith et al. |
| 7,072,367 | B2 | 7/2006 | Arisawa et al. |
| 7,120,323 | B2 | 10/2006 | Dyott et al. |
| 7,639,909 | B2 | 12/2009 | Murshid et al. |
| 7,646,957 | B2 | 1/2010 | Blauvelt et al. |
| 7,804,863 | B2 | 9/2010 | Adel et al. |
| 7,860,360 | B2 | 12/2010 | Rockwell et al. |
| 7,865,048 | B2 | 1/2011 | McCaughan et al. |
| 7,983,312 | B2 | 7/2011 | Shkunov et al. |
| 8,036,252 | B2 | 10/2011 | Islam |
| 2003/0053775 | A1 * | 3/2003 | Chen ............ G02B 6/02 385/123 |
| 2004/0190825 | A1 | 9/2004 | Kang et al. |
| 2004/0233941 | A1 | 11/2004 | Fajardo et al. |
| 2004/0233964 | A1 | 11/2004 | Yamanaka et al. |
| 2005/0013541 | A1 | 1/2005 | Kittaka et al. |
| 2005/0111803 | A1 | 5/2005 | Bickham |
| 2007/0171119 | A1 | 7/2007 | Dwelly et al. |
| 2007/0237455 | A1 | 10/2007 | Sonoda et al. |
| 2008/0131065 | A1 | 6/2008 | Windeler et al. |
| 2008/0226241 | A1 | 9/2008 | Sugizaki et al. |
| 2008/0259969 | A1 | 10/2008 | Piper et al. |
| 2010/0008624 | A1 | 1/2010 | Singer et al. |
| 2010/0044102 | A1 | 2/2010 | Rinzler et al. |
| 2010/0189392 | A1 | 7/2010 | Rockwell et al. |
| 2010/0189401 | A1 | 7/2010 | Shkunov et al. |
| 2010/0195194 | A1 | 8/2010 | Chen et al. |
| 2011/0128538 | A1 | 6/2011 | Cerullo et al. |
| 2011/0218431 | A1 | 9/2011 | Fink et al. |
| 2011/0306956 | A1 | 12/2011 | Islam |
| 2012/0155107 | A1 | 6/2012 | Cottrell et al. |
| 2012/0206793 | A1 | 8/2012 | Tanaka |
| 2012/0236881 | A1 | 9/2012 | Nikolajsen et al. |
| 2012/0263196 | A1 | 10/2012 | Pask et al. |
| 2012/0275475 | A1 | 11/2012 | Shkunov et al. |
| 2012/0330959 | A1 | 12/2012 | Kretz et al. |
| 2013/0020486 | A1 | 1/2013 | Zhang et al. |
| 2013/0043392 | A1 | 2/2013 | Mildren |
| 2013/0108206 | A1 | 5/2013 | Sasaoka et al. |
| 2013/0177273 | A1 | 7/2013 | Alfano et al. |

OTHER PUBLICATIONS

David A. Rockwell, "Multifunction Beam Delivery Fibers and Related System and Method", U.S. Appl. No. 13/464,370, filed May 4, 2012.

Masaharu Ohashi, et al., "Design of Strain-Free-Fiber with Non-uniform Dopant Concentration for Stimulated Brillouin Scattering Suppression", Journal of Lightwave Technology, vol. 11, No. 12, Dec. 1993, p. 1941-1945.

Liang Dong, "Limits of Stimulated Brillouin Scattering Suppression on Optical Fibers With Transverse Acoustic Waveguide Designs", Journal of Lightwave Technology, vol. 28, No. 21, Nov. 1, 2010, p. 3156-3161.

Peter D. Dragic, et al., "Optical Fiber With an Acoustic Guiding Layer for Stimulated Brillouin Scattering Suppression", 2005 Conference on Lasers & Electro-Optics (CLEO), 2005, p. 1984-1986.

Marc D. Mermelstein, "SBS threshold measurements and acoustic beam propagation modeling in guiding and anti-guiding single mode optical fibers", Optics Express, vol. 17, No. 18, Aug. 31, 2009, p. 16225-16237.

"Suppression of SBS by Discontinuous Brillouin Frequency Shifted Fibre in CPFSK Coherent Lightwave System with Booster Amplifier", Electronics Letters, vol. 27, No. 14, Jul. 4, 1991, p. 1231-1233.

Mitsuhiro Tateda, et al., "Suppression of stimulated Brillouin scattering in a strain-free single-mode optical fiber with nonuniform dopant concentration along its length", OFC/IOOC '93 Technical Digest, 1993, p. 205-206.

Donnell Walton, et al., "Kilowatt-level, narrow-linewidth capable fibers and lasers", Proc. of SPIE vol. 6453, 2007, 10 pages.

M. D. Mermelstein, et al., "SBS suppression and acoustic management for high-power narrow-linewidth fiber lasers and amplifiers", Proc. of SPIE vol. 7580, 2010, 13 pages.

Craig Robin, et al., "Experimental studies of segmented acoustically tailored photonic crystal fiber amplifier with 494 W single-frequency output", Proc. of SPIE vol. 7914, 2011, 8 pages.

Ray E. McVey et al., "Method and Apparatus for Implementing a Rectangular-Core Laser Beam-Delivery Fiber That Provides Two Orthogonal Transverse Bending Degrees of Freedom", U.S. Appl. No. 13/308,812, filed Dec. 1, 2011.

Notification of Transmittal of the International Search Report and the Written Opinion of the International Searching Authority, or the Declaration dated Jul. 26, 2013 in connection with International Patent Application No. PCT/US13/25395.

Notification of Transmittal of the International Search Report and the Written Opinion of the International Searching Authority, or the Declaration dated May 30, 2013 in connection with International Patent Application No. PCT/US13/25404.

Notification of Transmittal of the International Search Report and the Written Opinion of the International Searching Authority, or the Declaration dated May 10, 2013 in connection with International Patent Application No. PCT/US2013/028923.

Office Action dated Feb. 27, 2014 in connection with U.S. Appl. No. 13/464,370; 18 pages.

"Blimplike surveillance craft set to deploy over Maryland heighten privacy concerns"; The Washington Post, published Jan. 22, 2014; url http://www.washingtonpost.com/business/technology/bilmp-like-survelliance-crafts-set-to-deploy-over-maryland-heighten-privacy-concerns/2014/01/22/71a48796-7ca1-11e3-95c6-0a7aa80874bc_print.html; Jan. 22, 2014.

Office Action dated Dec. 4, 2014 in connection with U.S. Appl. No. 13/308,812; 23 pages.

Office Action dated Jul. 6, 2015 in connection with U.S. Appl. No. 13/308,812, 9 pages.

European Search Report issued for EP 13874501.3 dated Dec. 22, 2015, 10 pgs.

European Search Report issued for EP 13874791.0 dated Jan. 26, 2016, 8 pgs.

J.P. Dakin et al., "Compensated Polarimetric Sensor Using Polarisation-Maintaining Fibre in a Differential Configuration", Electronics Letters, IEE Stevenage, GB, vol. 20, No. 1, dated Jan. 5, 1984, pp. 51-53.

Ulrich R. et al., "Polarization Optics of Twisted Single-Mode Fibers", Applied Optics, Optical Society of America, Washington, D.C., US, vol. 18, No. 13, Jul. 1, 1979, pp. 2241-2251.

Non-Final Office Action issued for U.S. Appl. No. 13/308,812, dated Jan. 29, 2016, 11 pgs.

Office Action dated Jul. 14, 2016 in connection with U.S. Appl. No. 13/308,812.

* cited by examiner

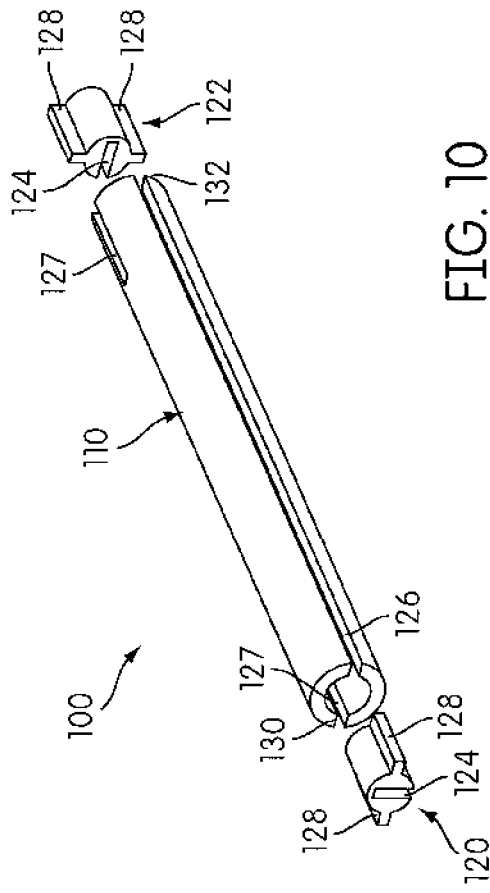
FIG. 10
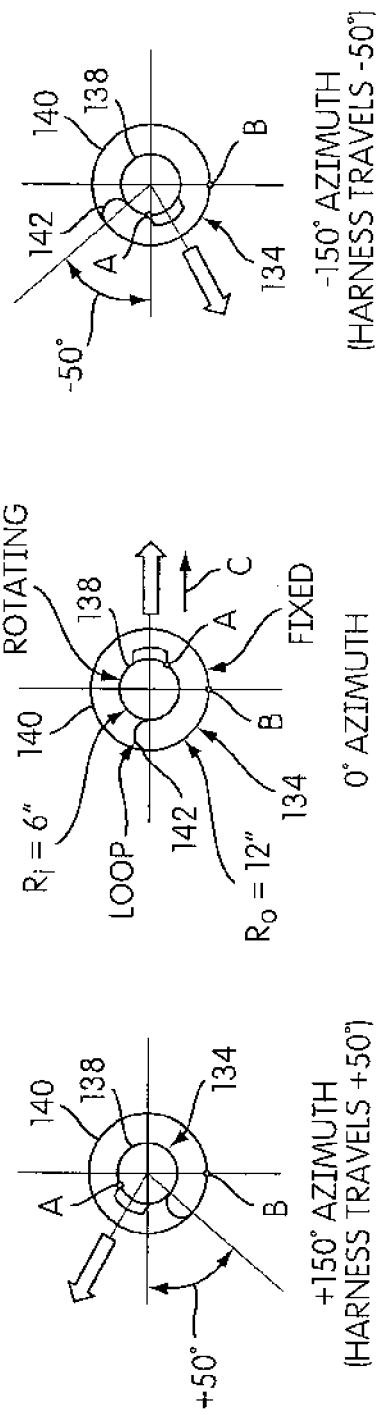
FIG. 11c
FIG. 11b
FIG. 11a

METHOD AND APPARATUS FOR FIBER DELIVERY OF HIGH POWER LASER BEAMS

BACKGROUND

The present disclosure pertains to an apparatus and a method for fiber delivery of high power laser beams.

Optical fibers can be used to transmit a laser beam from a laser source to a desired location. The use of an optical fiber to transmit a laser beam from a laser source to a desired location is a significant enabler in a number of laser applications because the optical fiber offers a flexible transmission path that involves no free-space optics and which can be re-routed in real time. For example, industrial lasers operating at wavelengths that can be transmitted through silica fibers almost universally use such optical fibers to move the laser beam from the laser source to the workpiece. Often, the output end of the optical fiber is attached to a robotic arm that directs the output beam to the workpiece. Another example is in medical applications, where an optical fiber is used to transmit a laser beam through a blood vessel to a specific location where the focused beam is used to accomplish a desired medical effect. Another example appears in solid-state laser designs, where radiation from pump diodes is commonly delivered to active region of a solid-state laser via fibers or bundle of fibers. Yet another example is in defense systems, where guiding a laser beam onto the inner gimbal of a beam director is desired without having to propagate through a complex sequence of optical elements that move and guide the laser beam.

While the first three examples above are already implemented in their respective application areas, the use of optical fiber delivery of laser beams in defense systems has been limited in the past by two challenges. First, the optical fiber in conventional systems is required to have a sufficiently large core area so that it can accommodate the required average or peak power without suffering from optical damage or degradation of the laser beam by nonlinear optical processes such as stimulated Brillouin scattering (SBS) or stimulated Raman scattering (SRS). Second, if a sufficiently large core is developed, the fiber must be designed such that the input beam quality, which for many military applications must be nearly diffraction-limited, is not degraded by propagation through the fiber.

Optical fibers are widely used for laser beam delivery in the industrial laser market. These optical fibers are capable of delivering laser beams with very high powers of interest. However, these conventional optical fibers are designed to transport radiation of highly multimode industrial lasers. These conventional optical fibers necessarily have core diameters as large as 0.5 to 1 mm and a large numerical aperture (NA) 0.1-0.2, such that the fibers are also highly multi-mode. Presently, there is no practical way to maintain high beam quality when using such conventional optical fibers for beam delivery. Due to the multimode aspect of these conventional optical fibers, bending of the optical fibers results in a strong mode coupling to the higher order transverse electromagnetic modes that are guided along with the fundamental and other lowest order transverse electromagnetic modes. If the lowest-order transverse electromagnetic mode is launched in these conventional optical fibers, the lowest-order mode will lose most of its power as it feeds higher-order transverse electromagnetic modes. As a result, even if the input beam is nearly diffraction-limited and the output beam suffers only minor power loss, the output beam quality is typically greater than 50-100 times diffraction limited (XDL). Therefore, these conventional optical fibers meet power-delivery requirement, but not beam-quality delivery requirements.

Another problem with typical beam-delivery fibers for high power lasers is that as the core diameter increases to accommodate the increasingly high laser power, the fiber becomes less flexible. At some point the basic purpose of the fiber, mechanical flexibility, becomes severely restricted due to the large fiber diameter.

To overcome the above deficiency with high beam quality transportation, a large mode area (LMA) optical fiber design can be implemented. LMA optical fibers can guide a few higher-order transverse electromagnetic modes while still maintaining beam quality at or better than approximately 1.3 times diffraction-limited (XDL). A LMA optical fiber differs from the standard large-core delivery fibers by having a relatively small core diameter, between about 20 µm and about 30 µm for signal wavelengths of about 1 µm, and a reduced NA of approximately 0.06. LMA fibers must be properly coiled to maintain good beam quality. At a prescribed core diameter, coiling induces bending losses to all transverse electromagnetic modes, but the higher-order modes all suffer much greater coil-induced loss than the desired lowest-order transverse mode. Hence, coiling results in increased radiation loss for higher-order transverse electromagnetic modes, which are stripped out of the core, thereby "cleaning up" the laser beam and yielding a beam having mostly the fundamental transverse electromagnetic mode. With an optimized coil radius, the loss for the fundamental transverse electromagnetic mode remains at a low and tolerable level.

A 10 kW fiber laser that generates a laser beam to be delivered to a beam director for use in industrial applications is often based on an LMA fiber. A conventional LMA beam delivery fiber can be considered to meet the requirements of beam delivery. Indeed, since the laser beam is generated by the LMA fiber in the first place, the LMA fiber can obviously accommodate the laser power. However, there are other considerations that need to be taken into account. Among these considerations is the onset of stimulated Raman scattering (SRS) or stimulated Brillouin scattering (SBS) as the beam-delivery fiber length approaches a few meters, as is required for typical applications.

What is needed is a method and apparatus that cure the deficiencies noted above in conventional optical fibers used for delivery of high power laser beams, and that provide an optical fiber taking into account the above considerations, including SRS and SBS.

SUMMARY

One embodiment of this disclosure provides an optical fiber including a core having a relatively large area selected so as to raise a threshold of stimulated Raman scattering or stimulated Brillouin scattering, or both, the core having a high aspect ratio elongated cross-section and having a first refractive index. The core is narrower in a fast-axis direction and wider in a slow-axis direction, such that the fiber is mechanically flexible in the fast-axis direction and is mechanically rigid in the slow-axis direction.

Another embodiment of this disclosure provides an optical apparatus including a laser, an optical fiber having an input end and an output end, and an optical coupler configured to input radiation from the laser through the input end of the optical fiber. The optical fiber includes a core having a relatively large area selected so as to raise a threshold of stimulated Raman scattering or stimulated Brillouin scattering, or both, the core having a high aspect ratio elongated cross-section and having a first refractive index. The core of the fiber is narrower in a fast-axis direction and wider in a slow-axis direction, such that the fiber is mechanically flexible in the fast-axis direction and is mechanically rigid in the slow-axis direction.

Another embodiment of this disclosure provides an optical apparatus including an optical fiber having an input end and an output end, and an end cap connected to the output end of the optical fiber. The optical fiber includes a core having a relatively large area selected so as to raise a threshold of stimulated Raman scattering or stimulated Brillouin scattering, or both, the core having a high aspect ratio elongated cross-section and having a first refractive index. The core of the fiber is narrower in a fast-axis direction and wider in a slow-axis direction, such that the fiber is mechanically flexible in the fast-axis direction and is mechanically rigid in the slow-axis direction.

Another embodiment of the present disclosure provides a method for fiber delivery of high power laser beams. The method includes providing a fiber including a core having a relatively large area selected so as to raise a threshold of stimulated Raman scattering or stimulated Brillouin scattering, or both, the core having a high aspect ratio elongated cross-section and having a first refractive index, wherein the core is narrower in a fast-axis direction and wider in a slow-axis direction, such that the fiber is mechanically flexible in the fast-axis direction and is mechanically rigid in the slow-axis direction. The method further includes launching a laser beam into the fiber, the laser beam having a width smaller than a width of the core along the slow-axis direction and the fast-axis direction, and propagating the laser beam through the fiber while avoiding onset of stimulated Raman Scattering or stimulated Brillouin Scattering, or both.

Yet another embodiment provides a method for fiber delivery of high power laser beams that includes providing a fiber including a core having a relatively large area selected so as to raise a threshold of stimulated Raman scattering or stimulated Brillouin scattering, or both, the core having a high aspect ratio elongated cross-section and having a first refractive index. The core of the fiber is narrower in a fast-axis direction and wider in a slow-axis direction, such that the fiber is mechanically flexible in the fast-axis direction and is mechanically rigid in the slow-axis direction. The method further includes launching a laser beam into the fiber, the laser beam having a width smaller than a width of the core along the slow-axis direction and the fast-axis direction. The method further includes propagating the laser beam through the fiber to provide a loss for any higher-order transverse electromagnetic modes that is greater than a loss for lower-order transverse electromagnetic modes so as to substantially remove the higher-order transverse modes along the slow-axis direction within the fiber core while reducing the onset of stimulated Raman Scattering or stimulated Brillouin Scattering, or both.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 10 is a perspective view of an portion of the optical fiber module in accordance with another embodiment;

FIGS. 11a-11c are schematic representations of implementations of a rolling loop approach using a fiber structure;

FIG. 12b is a cross sectional view of the portion of the fiber structure shown in FIG. 12a.

DETAILED DESCRIPTION

Figure 1:
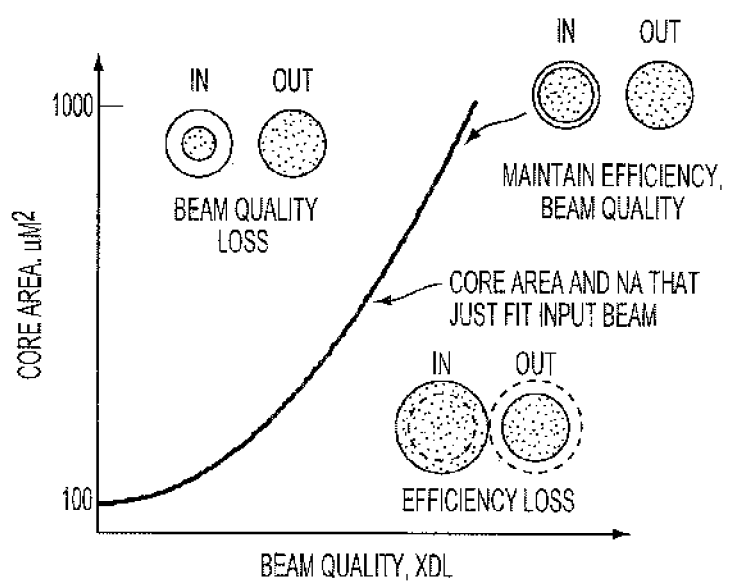
FIG. 1 is a schematic diagram showing why the core and NA of a circular-core delivery fiber must be specifically sized for the power and beam quality of a high energy laser (HEL) beam, otherwise the system suffers loss of efficiency or beam quality.

Defense related applications will often benefit from the availability of a beam-delivery means that can accept the output of a single high power (e.g., 10 kW or higher) solid-state or fiber laser with a beam quality better than approximately 1.3 times diffraction-limited (XDL) and can then deliver that laser beam to a remote location. In such defense applications, the beam delivery fibers must be capable of accommodating that high power level while maintaining the beam quality at about the same as from the original laser. In addition to the above aspects, such defense applications will specify that the beam delivery fiber be flexible and have a length up to about 10 m or more, so as to carry the high power laser beam onto the inner gimbal of a beam director and to have adequate length to accommodate the anticipated motion of the gimbal assembly in anticipated field scenarios.

For a laser wavelength of 1 µm and a spectral width broader than about 0.01 nm, one of the principal limitations of conventional fibers in this type of application is the ability to operate at the specified power without generating SRS. In a representative application using, for example, 10 kW fiber lasers, the power is high enough that the length of the conventional beam delivery fiber is limited to less than about 2 meters. However, in certain defense applications, this limited length is inadequate and very restrictive.

In general, SRS degrades the efficiency and probably also the beam quality of the transmitted laser beam. In particular, SRS can generate a backward-propagating beam, such that a significant portion of the initial signal power returns to the laser instead of reaching the intended target. At the same time, SRS broadens the frequency bandwidth of the signal power that continues to propagate in a forward direction. Such broadening is unacceptable for many applications. SRS can also generate a forward-propagating beam that, in general, comprises higher-order modes as well as the fundamental mode, and this process degrades the beam quality of the transmitted light.

For a continuous wave (CW) radiation or pulses longer than about 100 ps, the condition for the onset of SRS in an optical fiber is the following:

$$g\frac{2P}{A}L < 25 \quad (1)$$

where g is the medium-dependent Raman gain, P is the signal power, A is the core area, and L is the fiber length. The factor of 2 on the left side of equation (1) is an approximation that the effective area of the propagating fundamental optical transverse electromagnetic mode is about half of the actual core area.

For example, in fused silica, in which g=0.01 cm/GW, and for P=10 kW, the relationship between length L and core area A can be determined, as follows:

$$L < \frac{25A}{2gP} = 1.25A \quad (2)$$

where the length for onset of SRS is L in (cm) and A is the core area of the fiber in ($\mu m^2$).

Some defense applications further specify fiber delivery of lower-power beams onto a gimbal as part of a coherent Laser Detection and Ranging (LADAR) system. Although the nominal power for this application is lower at 1 kW, the spectral width is very narrow at less than 10 kHz. In this case, the limiting nonlinear process is stimulated Brillouin scattering (SBS). Equation (1) also applies for SBS. However, in SBS, the gain g in fused silica is higher at 5 cm/GW. For example, for a 1 kW signal power, the length limit is determined using equation (3).

$$L_B < 0.025A \quad (3)$$

where $L_B$ is the length for onset of SBS (in cm), and A is the core area of the fiber (in $\mu m^2$).

For a conventional LMA fiber having a relatively large core diameter of about 30 µm, the core area is about 700 µm². Using the core area of the LMA fiber of about 700 µm², the length limit L can be calculated using equation (2) to be about 8.4 m. It is noted, however, that this length corresponds to the length limit before reaching SRS threshold. A safe length value might be half of this length so as to provide a factor of 2 margin against the onset of SRS. Furthermore, if the HEL is a fiber laser, the calculated length limit must include the fiber laser itself, assuming both fibers are fabricated from silica. For example, for an output power of 10 kW, the fiber laser itself will consume much of the allowable length (even when the core of the fiber laser is larger than 30 µm). As a result, the tolerance to any additional length for the beam delivery fiber is minimal. Hence, a conventional LMA fiber cannot meet the requirement for a beam-delivery length of approximately 10 m without SRS.

Fibers have been scaled to larger areas than are available with a conventional LMA fiber, and in principle such large-area fibers could scale to longer lengths without SRS. However, scaling the diameter of a single-mode or few-mode fiber core must be accompanied by a further decrease in the core numerical aperture (NA) to less than about 0.03. This NA reduction is driven by the necessity to limit the number of guided transverse electromagnetic modes to a relatively low number. Otherwise, the mode discrimination mechanisms being employed to maintain single mode operation at higher powers will break down. Specifically, as the core size increases for a given NA, the effective mode indices for all core modes become very closely spaced such that the higher-order modes are nearly degenerate with the lowest-order mode. As a result, bend-induced mode mixing between the lowest mode and the many higher order modes becomes very strong, diverting power from lowest mode to the higher-order modes. In order to avoid this undesired consequence, it is important to avoid even minor bends and deformations of large-core fibers. Another issue with such fibers is the fact that, as the NA is reduced, the higher order modes become leaky, and it is no longer possible to flex a fiber without inducing unacceptable transmission losses. Having a larger core also makes the fiber more susceptible to refractive index inhomogeneities, increasing the difficulty in maintaining the excellent mode quality desired from advanced lasers.

One can avoid the bend sensitivity of large-core, low-NA fibers by designing the fiber so it does not bend. In fact, "rod-like" fiber lasers with core diameters up to 100 µm and very low NAs have achieved impressive power scaling. However, in these fibers the core is embedded in a quartz rod about 2 mm in diameter, rendering such fibers not flexible. The conclusion is that one cannot practically scale the core area of conventional fibers while maintaining the flexibility required by the beam-delivery application.

So far we have considered only the challenges associated with increasing the core area of fibers to the point that high-power operation can be achieved without the onset of SRS or SBS. However, even if a solution were found to suppress such stimulated scattering, large-core circular beam-delivery fibers also suffer from a different fundamental limitation that can best be understood by referring to FIG. 1. FIG. 1 shows a graph of a core area (for a given NA) of a conventional circular-core fiber versus the beam quality (XDL). The graph in this figure schematically represents the core area (for a given NA) required to accommodate a laser beam as a function of the beam quality of that laser beam. Since beam quality is typically expressed in a linear manner (i.e., the degree to which the beam diameter exceeds the diffraction limit) rather than area, the required core area will scale roughly with the square of the beam quality. The parabola in FIG. 1 shows the scaling of the core area as function of beam quality.

At the top-left side of the graph in FIG. 1, a situation is depicted where the actual core area of a beam-delivery fiber exceeds that prescribed by the parabola. Hence, an input beam will under-fill the core, as shown schematically in FIG. 1. By the time the beam propagates through the specified 10 m of fiber, for example, and assuming the fiber is dynamically flexed as the beam-director moves to track a target, the output beam will fill both the entire core area and entire NA, which both exceed the original beam area and divergence, correspondingly, as shown schematically in FIG. 1. The result is degradation in beam quality. It is noted that one could fill the core area, but not the NA, with the launched beam, but this will not eliminate the problem. Even if only a fraction of the NA is filled with the launched beam, the NA will inevitably fill. Hence, mode scrambling will be induced by flexing the fiber that necessarily occurs due to the motion of the beam director, and in this way, a consequence of the higher NA is a degradation of the transmitted beam quality.

At the lower-right portion of the graph in FIG. 1, a situation is shown where the core area is smaller than the size of the cross-section of the beam (e.g., the diameter of the beam is greater than the diameter of the fiber). Specifically, the input beam overfills the core of the delivery fiber. The output beam "out" will fill the core, and the power launched into the cladding will be lost, so the use of undersize fibers leads to a significant efficiency loss. Similar loss takes place if input beam size is reduced to fit within the fiber, which will cause the divergence to exceed NA at the fiber input.

The only satisfactory solution in this example is to operate precisely on the parabolic curve of FIG. 1. As the beam quality of the input beam increases, the circular-fiber core area must increase proportionately. The inverse is also true. This leads to the obvious problem that there is no circular fiber that can accommodate radiation of high power laser systems presently under development at Raytheon Company. These lasers will have good beam quality less than 2 XDL. Hence, beam quality can be maintained out of the circular beam-delivery fiber only if the fiber is selected from available small core areas at the bottom of the parabola. However, the high output power level greater than 100 kW instead requires a very large core area to minimize the efficiency loss, along with the negative consequences including optical damage and nonlinear phenomena such as SRS.

In principle, one could specify a highly multi-mode delivery fiber with a sufficiently large core area that it could accommodate the high laser power without encountering stimulated scattering or other intensity-dependent processes, and then employ some method to clean up the output beam to restore the desired good beam quality. For example, this can be achieved using a phase-conjugate architecture described in U.S. Pat. No. 5,208,699 entitled "Compensated, SBS-free Optical Beam Amplification and Delivery Apparatus and Method." In this case, the laser architecture must be modified from a simple fiber laser to a master oscillator-power amplifier (MOPA) configuration arranged such that the beam-delivery fiber and fiber amplifier are double-passed with a reflection from a phase-conjugate mirror (PCM) between passes. Although phase-conjugate compensation of the distortions of passive multi-mode fibers having core diameters of about 400 μm has conventionally been demonstrated, the application to larger-core fibers may be problematic due to limitations of the PCM compensation capability. In addition, the complexity of the phase-conjugate architecture adds cost and risk.

In the absence of a suitable fiber-based approach, one can choose from the two main non-fiber approaches that can be used to convey the signal beam from a high power laser to the beam director turret. A first approach is to outcouple the laser beam into free space remotely from the beam director turret, and to route the beam to and through the turret using a coudé path (comprising a series of optics mounted inside the turret apparatus, commonly used on large optical telescopes). Another approach is to mount the laser heads themselves on the beam director turret apparatus to minimize their attendant distance from their output fiber to the beam director turret. In this case, the turret, which needs to be able to slew to point the beam at the target, must carry the extra weight of the laser device, which can be considerable. In the first approach, the turret design is complicated by the coudé path. The optics in the coudé path need to be of sufficient size to accommodate the high energy laser beam without being either damaged or heated to the extent that the beam is optically distorted by a variety of mechanisms. The optics also must maintain alignment as the optical path varies over time and environment, and this requirement adds to the system cost and complexity.

Figure 2:
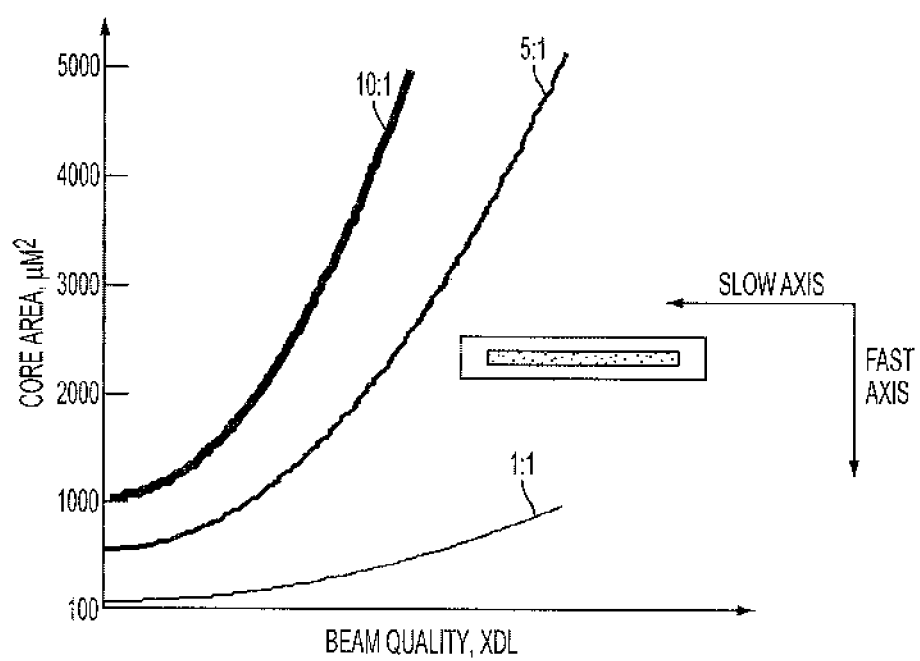
FIG. 2 is a schematic diagram showing how a high aspect ratio core (HARC) fiber offers an additional design degree of freedom, which lead to a family of optimization curves depending on the specified core aspect ratio.

A dramatic departure from all of the approaches discussed above is to continue using a waveguide, but to change the shape of the core. This approach begins by recognizing the primary conclusion of FIG. 1 that the use of a circular-core fiber is not possible with high-power, nearly diffraction-limited laser beams. However, this new approach also recognizes that the situation is quite different for a high aspect ratio core (HARC) fiber, as is schematically shown in FIG. 2. FIG. 2 shows a graph of the core area of the fiber as a function of beam quality (XDL) of the laser. The HARC fiber has a rectangular cross-section. In the rectangular core, one of the core dimensions, the "fast-axis" direction, is narrow. In one embodiment, the fiber core can be made narrow enough in the fast-axis direction to guide just a single fast-axis mode or perhaps a few lower fast-axis modes. The fast-axis cladding dimension can be also made narrow enough so as to provide mechanically flexibility of the fiber in this direction. In this way, the fiber becomes bendable in the fast-axis direction, and since it can be single-mode in this dimension, it can be bent without distorting the beam quality. On the other hand, the cross-section area of the core can be made very large due to extending core dimension along the orthogonal "slow-axis" dimension. In particular, the core area can be made large enough that very high laser powers can be launched without exceeding SRS threshold.

Some HARC features can be appreciated by comparing the graphs in FIG. 1 and FIG. 2. First note that a significant change of scale of the vertical axis is present in the plot of FIG. 2 as compared to the plot in FIG. 1. It can be seen that the HARC fiber provides a total of two degrees of freedom in specifying the core: the area and the aspect ratio. This allows for generation of a family of curves, each of which represents a given core aspect ratio (length of the core in the slow-axis direction divided by the length of the core on the fast-axis direction). A 1:1 aspect ratio will suffer the same limitations as for a circular-core fiber. However, for higher aspect ratios, one can simultaneously adapt the fast-axis dimension to the beam quality of the input beam (regardless of whether or not it is diffraction-limited), and then specify the slow-axis dimension such that the core can accommodate the total laser power without causing damage or exceeding the SRS threshold. No matter what beam quality and power level are required, a HARC fiber can be specified with an appropriate core aspect ratio.

A HARC approach was proposed in U.S. Pat. No. 7,042,631 entitled "Power scalable optical systems for generating, transporting, and delivering high power high quality laser beams" for hollow-core beam-delivery waveguides to increase their resistance to laser damage arising from energetic short pulses. The self-imaging properties of the rectangular-shaped core are used to transport a beam through the rectangular core waveguide, such that the output plane of the waveguide is the image of its input plane. However, this method is extremely sensitive to waveguide-core shape deformations as well as to flexing of the delivery path. Self-imaging is based on tracking the relative phases among all of the modes at very tight, sub-radian, tolerance levels. Minor imperfections in the core shape while manufacturing the waveguide, deviations of the propagation distance from a self-imaging distance, as well as simply flexing the waveguide all can destroy the relative phasing between the modes, thereby precluding the self-imaging phenomenon and its associated benefits. There is no practical way to transport a coherent beam using this method without also destroying the desired self-imaging.

Figure 3:
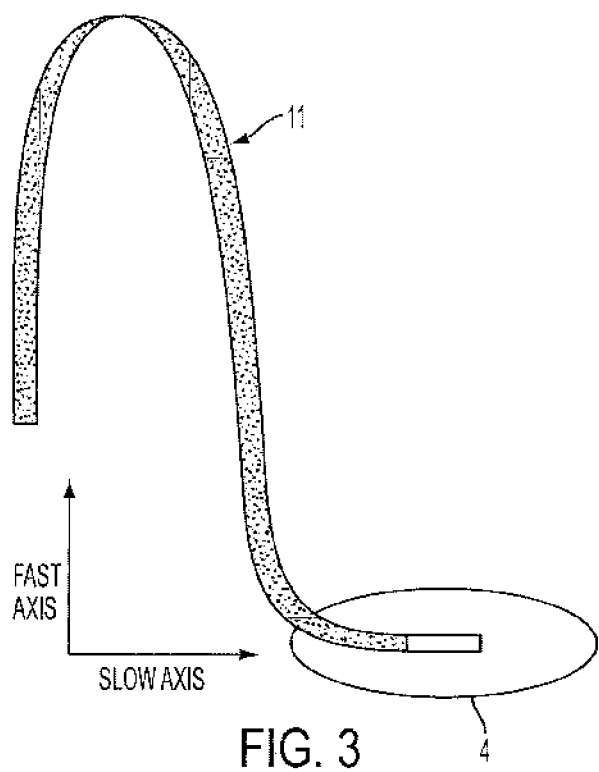
FIG. 3 is a schematic diagram of a HARC fiber following a curved path as might be required in a beam-delivery application, according to an embodiment.
Figure 4A:
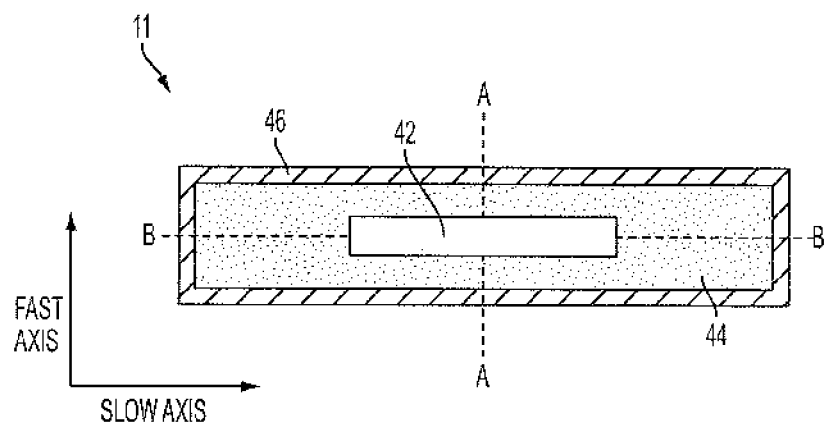
FIG. 4a is a schematic diagram of a cross-section of HARC fiber, according to an embodiment.

Yet another HARC approach, according to one embodiment, can be implemented without the limitations imposed by the reliance on self-imaging. This alternative approach uses a fiber that can be made from glass or other transparent material having a high aspect ratio core that is imbedded within a similarly high aspect ratio cladding. FIG. 3 is a schematic diagram of such a HARC fiber 11 that is following a curved path as might be required in a beam-delivery application. Note that due to its ribbon-like geometry, the HARC fiber 11 will only bend in its thin dimension, and this is schematically indicated in FIG. 3. FIG. 4a is a schematic diagram of a transverse cross-section 4 of fiber 11, according to one embodiment. Fiber 11 includes core 42, and cladding 44. Coating 46 covers cladding 44. In one embodiment, coating 46 can be a polymer coating or any other flexible coating. HARC fiber 11 has a rectangular cross-section, as shown in FIG. 4a. In one embodiment, rectangular core 42 of HARC fiber 11 has an aspect ratio that can range typically between about 30:1 to 100:1 or more, depending on laser power transmitted through fiber 11, and also depending on the application. The slow-axis and fast-axis are shown in FIG. 4a. The slow-axis is in the direction of the larger dimension of the rectangular cross-section of fiber 11 and the fast-axis in the direction of the smaller dimension of the rectangular cross-section of fiber 11.

As shown in FIG. 4a, core 11 is centered within fiber 11 such that vertical axis AA divides fiber 11 into two substantially identical symmetrical halves, and horizontal axis BB divides fiber 11 into two substantially identical symmetrical halves. However, as can be appreciated, core 42 does not need to be centered within fiber 11. For example, in one embodiment, core 42 can be offset from the axis of symmetry BB of fiber 11 (e.g., core 42 can be positioned at the "top" or "bottom" in fiber 11 so as to be closer to the top or bottom portion of coating 46). Alternatively, or in addition, core 42 can be offset from axis of symmetry AA of fiber 11 (e.g., core 42 can be positioned at a right side or a left side in fiber 11 so as to be closer to the right side or the left side portion of coating 46).

HARC fiber 11 is distinguished from the conventional LMA fiber by specifying a rectangular core 42 with a high aspect ratio having a very large area (e.g., up to 30,000 $\mu m^2$ or more). The area of core 42 is increased by expanding core 42 in one dimension only (in the slow-axis direction), while maintaining the other dimension (the fast-axis direction) at approximately the same size as the original radius of an LMA core. The fast-axis core thickness and numerical aperture can be selected so that the core fast-axis direction guides either a single mode or just few lower modes, analogous to a LMA fiber. In one embodiment, the fast-axis core thickness can be selected to match the input beam quality with respect to the fast-axis, so that the coupled light substantially fills the entire core fast-axis dimension and NA without any significant power loss into the cladding. According to this approach, the cladding surrounding the core is also kept relatively thin in the fast-axis direction to make the fiber mechanically flexible in the fast-axis direction. In one embodiment, because the laser-beam is matched to the core fast-axis dimension and NA, and due to the fact that the cladding is thin, the fiber can transport laser radiation over arbitrary trajectories involving fast-axis bends while maintaining the same input divergence and, hence, without compromising the fast-axis beam quality.

Therefore, the fast-axis core parameters can be specified to maintain the input beam quality in the presence of bends in the fast-axis direction. The slow-axis core parameters are specified in a complementary way, to allow the fiber to accommodate high laser powers without being subject to the limitations of stimulated Raman or Brillouin scattering or optical damage. For example, assuming dimensions of core 42 of HARC fiber 11 of about 10 $\mu m$ (which is single-mode in the fast-axis direction) by 0.5 mm (in the slow-axis direction) with an area of core 42 of about 5000 $\mu m^2$, the SRS threshold length L can be determined using Equation (2) to be about 62.5 m for a 10 kW signal. Therefore, allowing a factor of two margin, HARC fiber 11 could carry a high power laser beam (e.g., with a power of about 10 kW) a length of about 30 meters (i.e., approximately half of 62.5 m) without onset of SRS. With respect to a narrowband application limited by SBS, Equation (3) indicates that larger core dimensions of about 20 $\mu m \times 2$ mm with a core area of 40,000 $\mu m^2$ would allow a length of 10 m. Therefore, allowing a factor of two margin, this fiber can carry a 1 kW narrowband laser beam a length of about 5 m without SBS. As a result, by selecting appropriate dimensions for the core 42 of fiber 11, a threshold for occurrence of SRS, SBS or both can be raised.

Given that a suitably designed HARC fiber can carry a high-power laser beam without encountering SRS or SBS, it is now worthwhile to determine the impact the core size and shape might have on the output beam quality of the laser beam propagating along the fiber. Given that the core edges of a HARC fiber are made reflecting due to total internal reflection from the cladding material, and that the input radiation fills the core dimensions and NA, one might think that the resulting beam quality will be poor. In addition, it is also possible that the output beam quality from such a guide could be poor even if the launched beam has good beam quality but is launched improperly. That being said, the output slow-axis beam quality can actually be as good as the input beam quality if the following procedure, according to one embodiment, is employed.

First, in one embodiment, the beam is launched directly along the fiber axis. Such a launch provides for the conservation of the input light divergence through the entire path. This is because any reflections from the slow-axis core edges (which are parallel to the fiber axis and the beam propagation direction) invert the angular tilts of the rays with respect to the slow-axis, but the reflections do not increase the magnitude of the tilt angles. Since the high aspect ratio rectangular shape of the fiber resists any bending in the slow-axis direction, a HARC fiber that is bent in the fast-axis direction remains effectively straight along the slow-axis direction. This fact plus the specified launch conditions enable the input angular spectrum of the laser radiation to be symmetrical relative to the fiber axis. Consequently, reflections by the slow-axis core edges cannot increase beam divergence.

Second, in one embodiment, the beam is launched into the HARC fiber such that the beam completely fills the core slow-axis dimension. For a good input beam quality, the launched beam will excite just the lower-order slow-axis modes. Under these conditions, diffraction does not spread the input beam spot size, and the effective beam size is approximately constant through the entire fiber path, being restricted only by the core width. As stated above, the HARC fiber bent in the fast-axis direction will not suffer any slow-axis bends even for complex flex paths. Hence, the input beam divergence is conserved to the output end of the fiber, meaning that slow-axis beam quality (expressed as the product of the beam dimension and the beam divergence) is the same at the output end of the fiber as it was at the input end of the fiber.

Even though the HARC fiber shape allows bending to occur only in the fast-axis direction, it is also possible that a fiber following a complex path in delivering a high-power laser beam might require not just fast-axis bends, but also a twist of the fiber. Twisting a section of a HARC fiber can produce an effective negative planar lens that can defocus light and increase the beam divergence in the slow-axis plane. Twists can compromise the slow-axis beam quality even if the fiber axis is effectively straight in the slow-axis direction.

In view of the above situation, in order to maintain a good beam quality further steps may be implemented. First, the entire propagation path can be designed as a sequence of two types of deformations of the fiber ribbon, either with pure fast-axis bends, or with pure twists without any bends. The sections having each of the two types of deformation can be spliced to each other, but any given section of the fiber should have only one type of deformation. Under these conditions, the slow-axis beam quality is automatically conserved while propagating through purely bent regions, where the fiber is effectively straight and no twist lensing is present.

Second, compensation of the twist-induced lensing can be implemented in each of the twisted regions to eliminate beam quality distortions by the negative twist lens. Various methods of lens compensation can be implemented. For example, two methods of lens compensation which are described herein below can both be embedded within a fiber core, as disclosed in U.S. Pat. No. 7,860,360 entitled "Monolithic Signal Coupler for High-Aspect Ratio Solid-State Gain Media," by D. A. Rockwell and V. V. Shkunov, the content of which is incorporated herein by reference. The compensation methods all are based on the fact that the twist lens operates optically as an effective negative 1-D gradient-index (GRIN) lens with a focal distance dependent on both the length of the twisted region and the angle of twist. Compensation can be made by building into the core of the twisted region a positive GRIN lens having an equal and opposite lens power to the power of the negative lens originating from the twisted portion of the fiber. The positive lens effect can be created by producing a slow-axis refractive index variation into the core, as is usually done to produce commercial 2-D GRIN lenses. A similar focusing effect can also be created by profiling the core thickness along the slow-axis direction, making the core thicker at the middle, along the fiber axis, and narrower near the edges. Yet another compensation method would be to position one or more cylindrical lenses at each end of the twisted region, with the lenses designed to produce a net positive lensing effect that is equivalent to the defocusing power of the twist-induced lens.

The method proposed above can be effective for transporting multimode input radiation through a complex, dynamically flexing trajectory without sacrificing input beam quality. No extreme tolerance for compensation may be needed for this case. As a result, a slight optical coupling between transverse modes may be allowed, since it does not result in a significant increase in light divergence, but simply in a redistribution of phases between the many excited fiber modes.

Some fiber-delivery applications might require delivery of the best single transverse mode high power radiation, and the operations described in the above paragraphs may be insufficient for single transverse mode input radiation. Flexing the fiber might still be accompanied by mode mixing, because tolerances to eliminate this effect in a full-scale system might be too high to be practical. Hence, even if only a single transverse mode is coupled at the HARC fiber core input, flexing the path will induce power re-distribution into the higher modes. Since a HARC fiber guides all of the modes without loss, the higher-order modes will be present at the output together with the fundamental mode, and the resulting interference among the modes will compromise the output beam quality. Therefore, a radically different approach may be needed for delivering a truly single mode radiation through any flexed multimode fiber.

This radically different approach to fiber beam delivery of high-power laser beams is based on another novel type of fiber, specifically a semi-guiding high-aspect ratio core (SHARC) fiber. A SHARC fiber has been proposed as an amplifier for producing high power lasers. Examples of a SHARC fiber laser are described in U.S. Pat. No. 7,983,312 entitled "Method and Apparatus for Generation and Amplification of Light in a Semi-Guiding High Aspect Ratio Core Fiber," issued on Jul. 19, 2011, and in U.S. patent application Ser. No. 12/358,983 entitled "Apparatus and Method for Mode Control in a Semi-Guiding Amplifier Medium," filed on Jan. 23, 2009, the contents of each being incorporated herein by reference in their entirety.

Figure 4B:
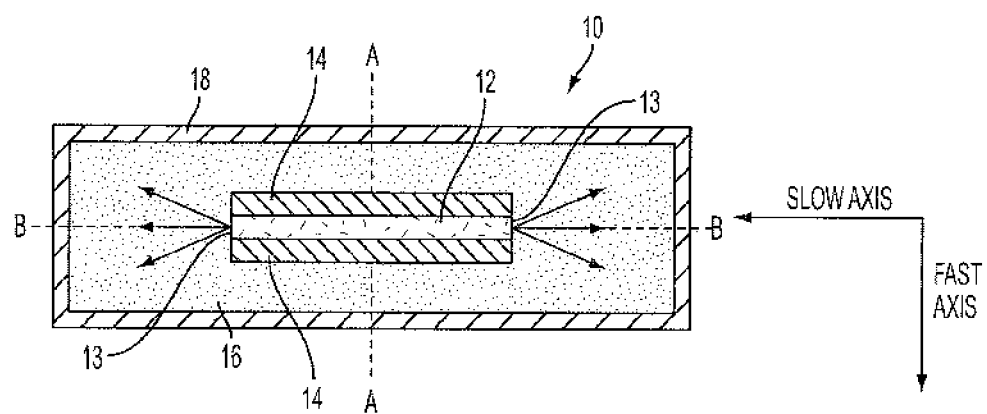
FIG. 4b is a schematic diagram of a cross-section of a semi-guiding high-aspect ratio core (SHARC) fiber, according to an embodiment.

FIG. 4b is a schematic diagram of a transverse cross-section of SHARC fiber 10, according to one embodiment. Fiber 10 includes core 12, signal or fast-axis claddings 14, mode refractive index matching (MIM) cladding 16 and coating 18. Core 12 is disposed or sandwiched between two signal claddings 14. Core 12 and signal claddings 14 are surrounded by MIM cladding 16. Coating 18 covers pump cladding 16. In one embodiment, coating 18 can be a polymer coating or any other flexible coating. SHARC fiber 10 has a rectangular cross-section, as shown in FIG. 4b. In one embodiment, rectangular core 12 of SHARC fiber 10 has an aspect ratio that can range typically between about 30:1 to 100:1 or more, depending on laser power transmitted through fiber 10, depending on the application. The slow-axis and fast-axis are shown in FIG. 4b. The slow-axis is in the direction of the larger dimension of the rectangular cross-section of fiber 10 and the fast-axis in the direction of the smaller dimension of the rectangular cross-section of fiber 10.

As shown in FIG. 4b, core 12 and claddings 14 are centered within fiber 10 such that vertical axis AA divides fiber 10 into two substantially identical symmetrical halves and horizontal axis BB divides fiber 10 into two substantially identical symmetrical halves. However, as can be appreciated, core 12 and/or claddings 14 do not need to be centered within fiber 10. For example, in one embodiment, core 12 and claddings 14 can be offset from the axis of symmetry BB of fiber 10 (e.g., core 12 and cladding 14 can be positioned at the "top" or "bottom" in fiber 10 so as to be closer to the top or bottom portion of coating 18). Alternatively, or in addition, core 12 and claddings 14 can be offset from axis of symmetry AA of fiber 10 (e.g., core 12 and cladding 14 can be positioned at a right side or a left side in fiber 10 so as to be closer to the right side or the left side portion of coating 18).

As was the case for HARC fiber 11, SHARC fiber 10 is distinguished from the conventional LMA fiber by specifying a rectangular core 12 with a high aspect ratio having a very large area (e.g., up to 30,000 μm² or more). The area of core 12 is increased by expanding core 12 in one dimension only (in the slow-axis direction), while maintaining the other dimension (the fast-axis direction) at approximately the same size as the original radius of an LMA core. Core 12 is designed to be semi-guiding, such that conventional refractive index-based guiding via total internal reflection (TIR) occurs substantially along the two large surfaces of the rectangular core at the interface between claddings 14 and core 12, while the narrow core edges 13 in the slow-axis direction are designed not to support TIR. In one embodiment, the refractive index step at core-edge boundary 13 is small enough, e.g., less than 500 ppm (for example, $10^{-4}$), such that higher-order core modes are free to diffract outside of the core (along the slow-axis direction). Thus, all wide-axis transverse electromagnetic modes (i.e., modes along the slow-axis) suffer radiation losses out through core edges 13. Although SHARC fiber 10 is described while referring to a specific fiber structure for producing the semi-guiding core, it can be appreciated that alternative structures can be employed for producing the same semi-guiding property.

One characteristic that SHARC fiber 10 shares with the HARC fiber 11 is that, although the area of core 12 can be very large (>30,000 μm²), the outside dimension of the fiber along the fast-axis is relatively small (e.g., not exceeding about 500 μm). In addition, in one embodiment, the numerical aperture NA of core 12 along the fast-axis is relatively small, approximately 0.06 for a core thickness about 15-25 μm, which is high enough to prevent the signal from leaking out through the fast-axis claddings in the presence of reasonable bend radii. Under these conditions, the SHARC fiber 10 is mechanically flexible in the fast-axis direction, and it can be flexed or coiled in this direction essentially without any loss for the fundamental mode. In contrast, as is described in the above paragraphs, very large-diameter, low NA circular core "rod-like" fibers are extremely sensitive to bends and cannot be formed into a low-loss coil without sacrificing beam quality and suffering massive diffraction loss. Therefore, by being bendable and having mechanical flexibility and a large core area while providing a properly matched fast-axis core thickness and NA, SHARC fiber 10 satisfies at least some of the criteria for being a candidate for fiber delivery of high power laser. In addition to these criteria, and as was discussed earlier for the HARC fiber, SHARC fiber 10 offers core areas of sufficient size to meet the laser power-delivery requirements, substantially without the onset of SRS or SBS by raising a threshold of stimulated Raman scattering or stimulated Brillouin scattering, or both.

A further criterion is to determine whether SHARC fiber 10 is able to deliver a relatively high power laser beam without degrading the power and beam quality of an input laser beam. SHARC fiber 10 is intrinsically capable of robust single-mode operation due to its unique core design. Rather than relying on conventional waveguide-based mode discrimination, which would be ineffective in a multimode waveguide and would, therefore, yield severely degraded output beam quality, SHARC fiber 10 relies on having a sufficiently wide core in the slow-axis direction that naturally allows beam propagation that is unaffected by core edges 13.

If the collimated input beam has a slow-axis beam width $w_b$ inside core 12 that is large enough that the Fresnel length $L_{Fr} \sim w_b^2 n/\lambda$ exceeds the fiber length L (where n is the refractive index of core 12 and $\lambda$ is the wavelength of the laser), and if a material of core 12 is optically homogeneous, then the beam will have had no chance to reflect from the core edges. As a result, the collimated output beam will retain the input beam quality. In addition, as modeling shows and experiments confirm, bending SHARC fiber 10 in the fast-axis direction has no affect on the slow-axis beam quality. One reason for this fact is that the very high core aspect ratio facilitates de-coupling of diffraction processes along the slow-axis and fast-axis directions. If any potential core imperfections induce wavefront distortions, or other processes scatter radiation from the original laser beam profile to more highly diverging rays, a clean-up via "loss filtering" helps to prevent beam quality reduction. Loss filtering exploits the fact that higher-order transverse electromagnetic modes, which represent the diverging light, diffract and leak more strongly out of the semi-guiding core region than the desired original lowest-order transverse electromagnetic mode does. This leakage is schematically represented in FIG. 4 as the diverging three arrows on each side of core edge 13. The application of loss filtering to mode-control in SHARC fiber amplifiers and lasers is described in detail in U.S. patent application Ser. No. 12/358,983 entitled "Apparatus and Method for Mode Control in a Semi-Guiding Amplifier Medium," filed on Jan. 23, 2009, the contents of which are incorporated herein by reference.

SHARC fiber 10 is either configured to be single-mode along the thin fast-axis direction, or to be effectively single-mode in this fast-axis by employing the same coiling method that was described above for LMA fibers. In the latter case, the thickness of the planar core 12 is made relatively small while simultaneously reducing the numerical aperture NA of core 12 along the fast-axis direction to reduce a number of guided fast-axis modes to only one or just a few. The fiber bending inherent in forming a coil in the fast-axis direction provides mode clean-up: higher-order fast-axis modes are stripped off, and only the fundamental transverse electromagnetic mode propagates essentially without radiative loss. However, while coiling is fully capable of maintaining a single mode if the fiber is formed into a static coil, in the beam-delivery application it is not obvious that the proper coil diameter will always be maintained during dynamic operation. Hence, it is preferred to design the fiber to be single-mode in the fast-axis direction.

In an active version of SHARC fiber 10, slow-axis mode control is achieved by exploiting a combination of two complementary mechanisms: (i) loss filtering, and (ii) gain filtering. The loss filtering mechanism is based on the fact that all slow-axis modes suffer radiation losses into cladding 16 through "open" core edges 13. The refractive index step (refractive index difference between refractive index of cladding 16 and refractive index of core 12) is designed to be approximately zero, so as to provide a loss for higher-order transverse electromagnetic modes that is greater than a loss for lower-order transverse electromagnetic modes propagating so as to substantially remove the higher-order transverse modes along the slow-axis within SHARC fiber 10. The radiation loss is highly mode dependent, favoring the fundamental mode, which is less lossy than the others. The gain filtering mechanism is achieved by profiling the gain stripe width in the slow-axis direction to make it narrower than the core width. Mode overlap with such a gain stripe is much greater for the fundamental mode than for any higher-order slow-axis mode, yielding a significant gain enhancement for the fundamental slow-axis mode. Detailed propagation studies of SHARC fiber 10 have quantified the mode dependent losses and gain discrimination or filtering mentioned above for several of the lowest-order transverse electromagnetic modes. These studies confirm that loss discrimination is adequate to accomplish the desired mode control for active fibers.

If SHARC fiber 10 is designed to be passive, which is the case for propagation and delivery of a laser, the gain filtering mode control mechanism is totally ineffective, since there is no gain medium in SHARC fiber 10. However, the loss filtering mechanism can be used for stripping out any higher-order slow-axis modes that might be generated while propagating through core 12.

However, the loss filtering mechanism offers only limited capability. Loss filtering can be used to remove high-order transverse electromagnetic modes propagating within SHARC fiber 10 but only up to a point. For example, for a slow-axis core width of about 2 mm, the lowest-order mode has a propagation loss rate $\alpha_0$ of approximately 0.004 m$^{-1}$, which amounts to approximately 4% loss for a 10 m delivery length. Since the loss rate $\alpha_m$ of mode m scales as the second power of the slow-axis mode number, i.e. $\alpha_m$ is proportional to $\alpha_0(m+1)^2$, where the mode number m=0, 1, 2, 3, . . . , the loss rates $\alpha_1$ and $\alpha_2$ of respectively modes 1 and 2 are, respectively, 0.016 and 0.036 m$^{-1}$, etc. Those values correspond to losses of about 15% and 30%, respectively, for a 10 m fiber length. While such losses are not insignificant, heavy losses greater than 90%, and thus the most effective transverse electromagnetic mode discrimination, occur only for modes of higher order, m>5. Consequently, if the fundamental transverse electromagnetic mode is distorted upon propagation through core 12, the higher-order slow-axis aberrations will be effectively filtered out, but the lower-order aberrations might remain in the output beam, reducing the transmitted beam quality.

A number of approaches are identified for reducing or substantially eliminating lower-order aberrations in the transmitted beam. These approaches, described in the following paragraphs, can be used separately or in combination to achieve the desired effect.

First, in one embodiment, the width of core 12 in the slow-axis direction can be reduced to an optimum value for which the loss factor becomes sufficiently high for the mode m=1 (i.e. the first higher-order mode). Modeling shows that the radiative loss rate $\alpha_m$, through the core slow-axis edges 13 scales as the third power of the width w, so that $\alpha_m$ is proportional to $1/w^3$. For this reason, if a core width w of 1.2 mm is used instead of 2 mm, the loss rates $\alpha_m$ will be increased for all modes by a factor 4.6. As a result, the transmission losses for higher transverse electromagnetic modes after 10 meters of propagation will increase to about 53% for m=1 and increase to about 82% for m=2, and the losses become very strong, greater than 95%, for m>2. Such loss discrimination may be sufficient for mode "clean up" (i.e., higher mode discrimination), taking into account the fact that only the fundamental transverse electromagnetic mode is launched into SHARC fiber 10, while higher order transverse electromagnetic modes arise when seeded by the fundamental transverse electromagnetic mode if it propagates through optical imperfections in core 12. However, one drawback of this approach is that the cost for beam quality improvement is the increased radiative loss for the lowest-order fundamental transverse electromagnetic mode. For example, for core 12 having a width of about 1.2 mm and fiber 10 having a length of about 10 m, the fundamental transverse electromagnetic mode loss to cladding 16 amounts to about 18%.

Second, since the propagation losses occur when the signal beam is incident on the lossy core edges 13, the losses can be eliminated by making core 12 wide enough that the beam does not reach core edges 13. This situation can be achieved if the following conditions are met.

(a) For an input beam width $w_b$ inside core 12, the fiber length L is specified to be less than the Fresnel range $L_{Fr} \sim w_b^2 n/\lambda$;

(b) The core material is substantially optically homogeneous;

(c) The core width w exceeds the width of the diffracted signal at the output end of the fiber.

(d) The defocusing effect of any twist-induced slow-axis lensing is weak compared to the diffraction effects corresponding to the specified mode size. This condition can arise either because of a small twist angle, or due to accurate compensation of the negative twist lens.

For example, for a SHARC fiber 10 having a length of about 10 m, the input beam width $w_b$ is selected to be greater than 2.2 mm and a width w of core 12 is selected to be greater than 3 mm to satisfy the above conditions. Condition (b) above is not unique to SHARC fiber 10, since optical homogeneity is a general condition for making high-performance fibers with minimal mode distortion.

For both HARC and SHARC fibers, which in the following paragraphs will collectively be referred to as (S)HARC fibers, two separate sources of mode distortion need to be controlled. A first source of distortion is optical imperfections of the core. Such imperfections can arise from either inhomogeneities of the glass (e.g., silica) forming the core, or inaccurate shaping of the core, particularly core thickness fluctuations. Accurate selection and purification of the glass material for the core, together with accurate control of the temperature uniformity during the fiber draw process, are usually employed to achieve the highest core-glass homogeneity. However, if any core imperfections induce wavefront distortions, or if other processes scatter light from the original beam profile to more highly diverging rays, a clean-up via loss filtering in the SHARC fiber option helps prevent beam-quality reduction in the output beam.

A second source of optical distortions is fiber deformations. Fiber deformations can be minimized as follows. First, planar fiber core 12, 42 of fiber 10, 11, respectively, can be made purely single-mode in the fast-axis direction. This can make the fast-axis mode profile insensitive to any bends along the fast-axis direction. Second, as modeling shows and experiments confirm, bending a (S)HARC fiber in the fast-axis direction has no deteriorating effect on the slow-axis beam quality. As stated above, one reason for this fact is that the very high core aspect ratio facilitates complete decoupling of the diffraction processes along the slow-axis and fast-axis directions. However, bending core 12, 42 in the slow-axis direction can potentially destroy the slow-axis beam quality. For this reason, extra care may be taken to prevent fiber 10, 11 from making slow-axis bends. In one embodiment, this can be accomplished, for example, by specifying that fiber 10, 11 have a rectangular external shape as well as a rectangular core 12, 42 (as shown for example in FIGS. 4a and 4b). In one embodiment, an aspect ratio for the external shape of fiber 10, 11 (i.e., ratio of width to height of fiber 10, 11) of three or more can be sufficient for this purpose. This would make the entire fiber 10, 11 behave as a ribbon so that it easily accommodates bends and twists in the fast-axis direction, but would strongly resist any deformations in the slow-axis direction.

Modeling and experiments consistently show that, while bends of (S)HARC fiber 10, 11 substantially do not affect the slow-axis beam quality, twists can induce an additional divergence to the laser beam thus making fiber 10, 11 function as an effective negative lens affecting only the slow-axis direction. In one embodiment, a focal length F of the effective negative lens varies as $F=-\Delta L/\phi^2$, where $\Delta L$ is the twist length, and $\phi$ is the twist angle integrated over the length $\Delta L$. The twist-induced lenses generated in separate regions of fiber 10, 11 may yield a combined lens that is the sum of the individual lenses, regardless of whether the twists are in the same direction. Hence, in one embodiment, if a ribbon fiber 10, 11 experiences a uniform twist along the entire fiber length L, the integrated twist angle must be less than about 0.3 radian to maintain a focal length F much greater than fiber length L (i.e., F>>L) and to minimize any lensing-based de-focusing of the signal beam. The same expression indicates that localizing twists over the short portions of the fiber, $\Delta L<<L$, to accommodate a larger overall twist is not desirable, since it produces a stronger planar negative lens.

Therefore, another approach for ensuring high quality laser beam transmission is to optimize the trajectory and twisting of fiber 10, 11 if the beam delivery is to be made through a kinked, non-straight path. A universal optimal fiber trajectory cannot be defined for all applications, because the trajectory will depend on the particular path shape and the locations of both the input and output mounts. The objective of the optimization is to distribute deformations along fiber 10, 11 to reduce local twists by adjusting the fiber so that the trajectory comprises a series of bends. By distributing deformations along fiber 10, 11, the overall twist can be minimized and the twist rate can be distributed along fiber 10, 11 as smoothly as possible.

Yet another approach can be employed specifically to deal with a twist-induced lens. If twists of the delivery fiber are unavoidable, the design can be developed such that the twisted portion of the fiber occurs over a fiber length $\delta L$ near the output end of the fiber. This length is then specified to be shorter than a characteristic distortion length, $L_{dist}$, that is related to the twist-induced focal length F; specifically, $\delta L<L_{dist}\sim w_{core}/\delta\theta_F$, where $\delta\theta_F=(w_b/2F)$ is twist-induced divergence angle, $w_{core}$ and $w_b$ refer to the core and beam widths, and $F=\delta L/\phi^2$ is the negative lens focal distance associated with the twisting angle $\phi$. The latter condition on $\delta L$ is satisfied if the core is sufficiently wide compared to the beam size, $w_{core}>w_b\phi^2$, which is readily satisfied for small twist angles, $\phi<0.5$ rad, but would require extended core width, $w_{core}>w_b$ if the twist angle exceeds 45°. The output beam for such a geometry is undistorted, but it carries a curved wavefront. Additional optics would be needed then to restore beam collimation. An external cylindrical slow-axis lens, with either a fixed (for a static delivery-fiber path) or an adjustable position (for a dynamic delivery-fiber path), can be added at the fiber output to eliminate any residual impact of the twist lens.

In the preceding paragraphs, various approaches are described whereby (S)HARC beam delivery fiber 10, 11 is configured to yield an output signal with beam quality comparable to that of the input signal. However, for the SHARC fiber option, some of these approaches may lead to a fraction of the signal or radiative power being lost. These radiative losses simply represent power that resides within the cladding rather than within the core. These radiative losses do not represent heat within the fiber that must be dissipated. Therefore, the optical power that is "lost" within the cladding can be extracted from the fiber.

There are several methods for removing the signal power from the cladding. In one embodiment, for example, the numerical aperture NA of cladding 16 at its outer surface could be designed to be low, thereby allowing much of the power lost from the core to exit fiber 10 altogether. Alternatively, in another embodiment, a silica collar can be attached around or coupled to fiber 10 periodically along the length of fiber 10. In one embodiment, the collar could be refractive index-matched to cladding 16 of SHARC fiber 10 to extract the power from the cladding 16 and direct the power to an appropriate absorber. In other words, a refractive index of the collar is substantially equal to a refractive index of cladding 16.

In high-power applications, one approach for extracting the optical power in cladding 16 is the following. First, SHARC fiber 10 has a coating 18 (e.g., a polymer coating) to protect the glass fiber surface. In one embodiment, the polymer coating 18 can be selected to be highly transparent at the signal wavelength so that the power in cladding 16 is allowed to leave fiber 10 without being absorbed by the coating 18.

A second approach is to contain the fiber 10 within a water-cooling jacket that can be configured and arranged to remove the power by convective flow. An analysis has been performed to verify that the above approach is adequate even for a high loss rate of, for example, 0.016 m$^{-1}$. The optical power $q_{optical}$ lost from fiber core 12 was set equal to the power $q_{coolant}$ convectively transported from the fiber via the cooling jacket. The optical power lost from fiber core 12 is given by equation (4) and the power convectively transported from fiber 10 via the cooling jacket is given by equation (5).

$$q_{optical}=(P_{in}-P_{out})=P_{in}(1-e^{-\alpha L}) \quad (4)$$

$$q_{coolant}=\frac{dm}{dt}C_p\Delta T=\rho UAC_p\Delta T \quad (5)$$

where $P_{in}$ corresponds to input radiative power, $P_{out}$ corresponds to output radiative power, $\alpha$ is the dissipative rate of fiber 10 and L is the length of fiber 10, $C_p$ is the heat capacity of fluid around fiber 10, dm/dt is the fluid mass flow, $\Delta T$ corresponds to the temperature difference between the fluid at the input and at the output, $\rho$ is the density of cooling fluid, A is a fluid flow cross-sectional area, and U is the flow velocity of the fluid.

Therefore, in one embodiment, for a fiber length L of about 10 m having a core loss rate $\alpha$ of about 0.016 m$^{-1}$, the optical power $q_{optical}$ lost from core 12 is calculated to be about 1.5 kW. Using a cooling jacket around fiber 10 with 1 cm$^2$ of water-flow cross-sectional area, and an allowable temperature rise $\Delta T$ of 10° C. between the input and the exit manifolds, the convective water mass flow required is calculated to about 37.4 g/s, knowing that the heat capacity $C_p$ of water of 4.186 J/(g–C). Since the density $\rho$ of water is 1 g/cm$^3$, this mass flow equates to a flow velocity U=9.36 cm/s, and also a volumetric flow rate of 2.25 liters/min, which can be readily supported by a modest water pump. Although water is used in this example, any other suitable coolant can be used.

Integrating (S)HARC fiber 10, 11 can be implemented as follows for delivery of a high power laser beam from a laser source to a point of use. The input end of (S)HARC fiber 10, 11 can be connected to a laser source such as, but not limited to, a LMA fiber laser (e.g., a 10 kW LMA fiber laser) through optical coupler 20 described in the following paragraphs with reference to FIG. 3.

Figure 5:
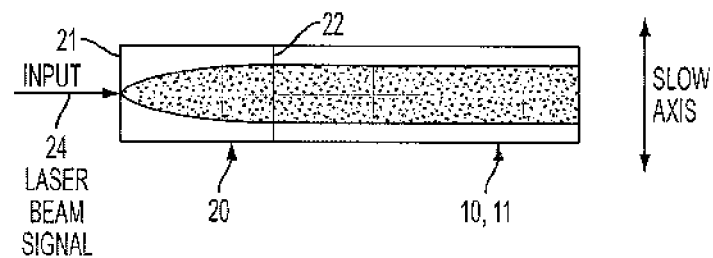
FIG. 5 is a schematic representation of an optical coupler for coupling an output of a laser to a HARC or SHARC fiber, according to one embodiment.
Figure 7:
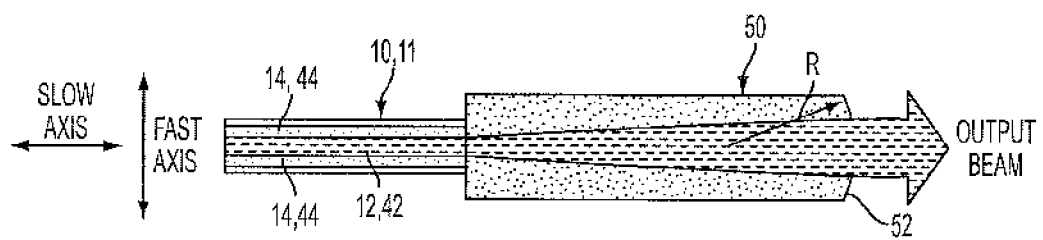
FIG. 7 is a schematic representation of an output end-cap disposed at an end of semi-guiding fiber shown in FIG. 1, according to one embodiment.

FIG. 5 depicts schematically optical coupler 20, according to one embodiment. In one embodiment, optical coupler 20 is configured to couple the output of the fiber laser (not shown) to (S)HARC fiber 10, 11 for delivery of the laser energy to a desired point of use. In one embodiment, both the fiber laser (signal fiber) and (S)HARC fiber (delivery fiber) 10, 11 are fusion-spliced to opposite ends 21 and 22 of optical coupler 20 to form a monolithic device for conducting laser signal 24 into (S)HARC fiber 10, 11 without the need for free-space optics. The output end of (S)HARC fiber 10, 11 can be fusion-spliced to an end-cap, which is shown in FIG. 7, that allows the high-power beam output by (S)HARC fiber 10, 11 to expand and reshape without using any free-space optics. Once the output beam exits the end-cap, the signal can be handled the same as any other free-space beam on the inner gimbal. A detailed description of the end-cap is provided later, after we describe the coupler.

Optical coupler 20 reformats a diffraction-limited, circular input laser beam 24 (e.g., having a diameter of about 20 μm to 30 μm) into a collimated high-aspect ratio elliptical beam for injection into (S)HARC fiber 10, 11. The narrow dimension of the re-formatted beam remains comparable to a size of the initial beam 24 (e.g., between about 20 μm to 30 μm), but the beam is expanded and collimated in the orthogonal wide dimension up to 2 mm or larger, as needed. In one embodiment, optical coupler 20 can be implemented as an integrated component.

In one embodiment, optical coupler 20 is configured to have a small size and is configured to allow two very different optical fibers (the input fiber laser and (S)HARC fiber 10, 11) to be spliced to optical coupler 20 on ends 21 and 22. In one embodiment, input end 21 is configured to receive a commercial circular-core fiber and output end 22 is configured to receive (S)HARC fiber 10, 11. However, as can be appreciated, input and output ends 21 and 22 can each also be configured to receive a (S)HARC fiber, for example, a (S)HARC fiber from a (S)HARC fiber laser at input end 21, and a (S)HARC beam-delivery fiber 10, 11 at output end 22. In this latter case, which would be applied in situations in which the beam-delivery fiber has core dimensions that are different than the (S)HARC fiber laser core dimensions, the coupler 20 would be designed to interface to the respective core dimensions of the two (S)HARC fibers.

In the fast-axis direction (perpendicular to the plane of FIG. 5), optical coupler 20 exploits ordinary refractive index-based waveguiding to maintain a constant fast-axis dimension, assuming the circular-core diameter is the same as the thin dimension of the rectangular core. If an application should require that the fast-axis dimensions differ, the fast-axis refractive index-based waveguide could be tapered or expanded along the length of optical coupler 20, as needed to match the circular beam to the rectangular thin dimension of core 12, 42.

In the slow-axis direction, the beam exiting the circular aperture is allowed to freely diffract. However, in one implementation a medium of optical coupler 21 is selected to have a graded refractive index profile to function as a one-dimensional (1-D) gradient-index (GRIN) lens. In one embodiment, the length of optical coupler 20 is specified such that the slow-axis GRIN lens is a quarter-pitch length that essentially collimates the diverging beam that leaves the circular-core input fiber. Both the quarter-pitch length and the final slow-axis dimension of the signal beam can be controlled by proper specification of the refractive-index profile in the GRIN section.

Figure 6:
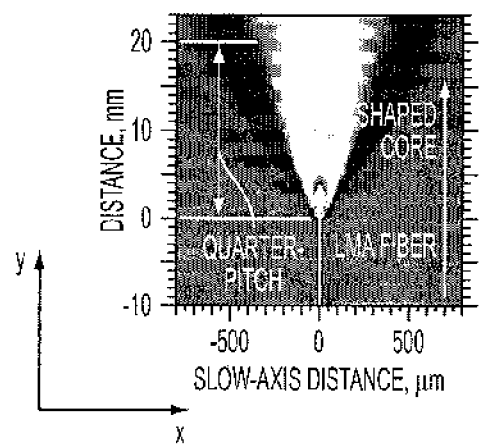
FIG. 6 is a gray-scale graphic representation of results of a 3D propagation simulation of a laser beam through the optical coupler and the HARC fiber shown in FIG. 3, according to one embodiment.

In order to confirm the performance of optical coupler 20, a 3-D propagation simulation was performed to demonstrate coupling from a relatively small core diameter (e.g., 20 μm) of an LMA input fiber to (S)HARC fiber 10, 11 having, for example, a 20 μm by 1 mm core. FIG. 6 is a gray-scale representation of the results of the 3-D propagation simulation, according to one embodiment. The vertical (y) axis represents the distance propagated by the laser within the LMA fiber and optical coupler 20, and the horizontal (x) axis represents the dimension of the LMA fiber and optical coupler 20 along the slow-axis direction. As shown in FIG. 6, upon leaving the input fiber (e.g., LMA fiber), the laser beam propagates in the direction of the white arrow through optical coupler 20, which has a planar GRIN lens. As the laser beam propagates along the y-axis, the laser beam remains guided in the fast-axis direction perpendicular to the plane of FIG. 4a, 4b, but the laser beam begins to undergo diffractive propagation in the slow-axis direction (the x-axis direction as shown in FIG. 6) under the influence of the planar GRIN lens in optical coupler 20. As shown in FIG. 6, the influence of the planar GRIN lens is to systematically vary the slow-axis beam divergence until the beam is collimated after propagating the quarter-pitch length (e.g., 20 mm) within the optical coupler 20. At the end of the quarter-pitch length, the laser beam is expanded to fill the width (e.g., 1 mm) of (S)HARC fiber 10, 11 at the end of optical coupler 20. Although optical coupler 20 is described while referring to specific dimensions of the laser beam and the fibers, it can be appreciated that optical coupler 20 can be designed and configured to accommodate alternative sizes of the input and output fibers.

FIG. 7 is a schematic representation of output end-cap 50, according to one embodiment. The function of end cap 50 is based on the fact that the signal beam within (S)HARC fiber 10, 11 enters output end-cap 50 with a high divergence in the fast-axis direction and a much lower divergence in the slow-axis direction. In one embodiment, the end-cap 50 is made from bulk fused-silica. Due to this difference in divergence angles, there exists a propagation distance within end-cap 50 where the beam sizes in the fast-axis and slow-axis directions are substantially equal. End-cap 50 is terminated at this location. This location corresponds to exit surface 52 of end-cap 50. Exit surface 52 is shaped, in one embodiment, so as to reduce the fast-axis divergence to match the slow-axis value without changing the slow-axis divergence. Therefore, the exit beam has an aspect ratio of approximately one, and essentially the same divergence in the two orthogonal transverse directions. For example, if core 12, 42 of (S)HARC fiber 10, 11 has a size of 10 μm by 2 mm, analysis shows that, in order to achieve the above divergence control in the fast-axis, the length of end-cap 50 is about 30 mm and the radius of curvature of exit surface 52 is about 25 mm. As it can be appreciated, if one desired simply to reduce the beam aspect ratio, but not achieve a final aspect ratio of unity, the length of the end-cap could be specified to be that which would yield that desired final aspect ratio.

In one embodiment, a second end-cap may also be provided to (S)HARC fiber 10, 11. The second end-cap can be connected to the input end of the (S)HARC fiber 10, 11. The second end-cap can be configured to receive a free space laser beam from a solid state laser or other types of lasers so as to input the free space laser beam into the (S)HARC fiber 10, 11. In one embodiment, the second end-cap may be similar to the above described end-cap 50.

As it can be appreciated from the above paragraphs, a method for fiber delivery of high power laser beams includes providing a fiber (fiber 11) including a core (core 42) having a high aspect ratio elongated cross-section along a slow-axis direction of the fiber (fiber 11), the core (core 42) having a first refractive index, and the fiber (fiber 11) including a cladding having a second refractive index. The method further includes launching a laser beam (e.g., a laser beam having a power equal to or greater than about 10 kW) into the fiber (fiber 11), the laser beam having a width $w_b$ smaller than a width w of the core (core 42) along the slow-axis direction. The method further includes propagating the laser beam through the fiber (fiber 11), while reducing onset of SRS or SBS, or both.

As it can also be appreciated from the above paragraphs, a method for fiber delivery of high power laser beams includes providing a fiber (fiber 10) including a core (core 12) having a high aspect ratio elongated cross-section along a slow-axis direction of the fiber (fiber 10), the core (core 10) having a first refractive index; first and second signal claddings (claddings 14) positioned in contact with and sandwiching the core (core 12), the first and second signal claddings (claddings 14) having a second refractive index; a third cladding (cladding 16) substantially surrounding at least side edges (edges 13) of the core (core 12), the third cladding (cladding 16) having a third refractive index, wherein a difference between the first refractive index of the core (core 12) and the third refractive index of the cladding (cladding 16) is small, e.g., less than 500 ppm (for example, $10^{-4}$). The method further includes launching a laser beam (e.g., a laser beam having a power equal to or greater than about 10 kW) into the fiber (fiber 10), the laser beam having a width $w_b$ smaller than a width w of the core (core 12) along the slow-axis direction. The method further includes propagating the laser beam through the fiber (fiber 10) so as to provide a loss for higher-order transverse slow-axis electromagnetic modes that is greater than a loss for lower-order transverse slow-axis electromagnetic modes so as to substantially remove the higher-order transverse slow-axis modes propagating along the fiber (fiber 10), while reducing onset of SRS or SBS, or both.

There are various applications for embodiments of the present disclosure. For example, on a ship-borne laser system, the (S)HARC fiber 10, 11 enables placement of the laser source (or multiple laser sources) below deck, from which the beam can be routed via (S)HARC fiber 10, 11 directly to the beam director apparatus without the need for a coudè path. For example, on an aircraft-based laser weapon system, (S)HARC fiber 10, 11 allows the laser source or sources to be packaged on the vehicle at locations that enable the aircraft design's center of gravity and flight characteristics to be optimized and, from these locations, the laser can be delivered to a desired point by using (S)HARC fiber 10, 11.

Therefore, (S)HARC fiber 10, 11 described herein has a broad range of applications including delivery of any laser beam to a desired location while enabling efficient packaging. One of the benefits provided by (S)HARC fiber 10, 11 is solving the packaging difficulties on military platforms that arise when the output fiber from the laser source is constrained to a length of only a few meters. (S)HARC fiber 10, 11 enables transmission of a laser beam or multiple laser beams from a fiber laser source to the beam director-turret apparatus, where the beam(s) from the fiber(s) can be outcoupled into free space.

During beam delivery, fiber 10, 11 for example, may be used to propagate a HEL beam from the laser generator to the inner gimbal of a beam control system, thereby replacing the more typical coudè path. Fiber 10, 11 should be capable of flexing at irregular times with irregular deformations because the beam director may be exercising two angular degrees of freedom (sometimes rapidly). That is, fiber 10, 11 should be capable of accommodating both angular degrees of freedom of the assumed two-axis gimbal assembly. In one embodiment, the fibers may be aligned along each of the two respective displacement directions in such a manner that fiber 10, 11 consistently bends in only one direction, and then changing that direction when needed by twisting the fiber by 90 degrees. This approach enables fiber 10, 11 to accommodate the angular displacement along two orthogonal directions. However, as described above, twisting of the rectangular core of a HARC fiber may produce a negative gradient index (GRIN) lens in the slow-axis plane of the rectangular core. Thus, distortion may arise due to the 90 degree twist in fiber 10, 11.

Figure 8:
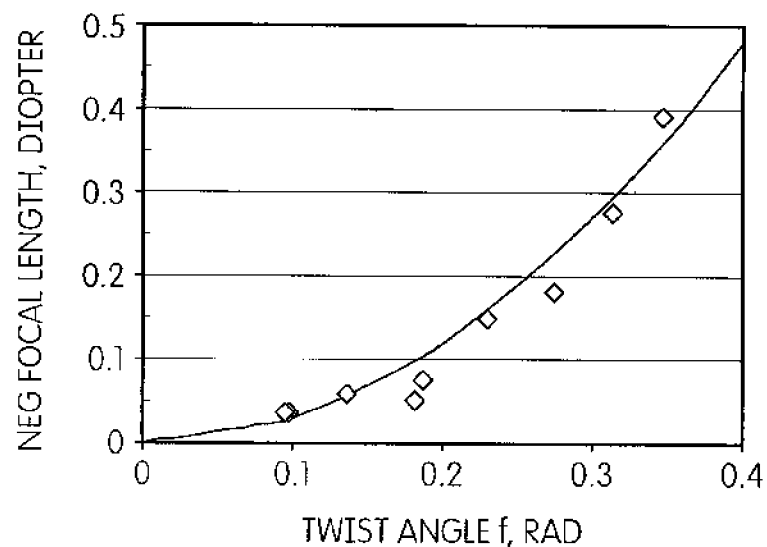
FIG. 8 shows is a plot of a theoretical model representing twist-induced focal length as a function of twist angles and measured twist-induced focal length as a function of twist angles.

FIG. 8 shows calculated results of a theoretical model representing twist-induced focal length as a function of twist angles and measured twist-induced focal length over a range of twist angles from 0 to 0.35 rad. As shown in FIG. 8, the twist lens monotonically increased and reached 0.4 diopters at 0.35 rad with a constant twisting rate along a twist length of about 30 cm. The model fits with the data, at least over the range of twist angles from 0 to 0.35 rad. The model is based on the following equation:

$$F_T = L_T/\phi^2 \qquad (6)$$

where the twist lens focal length, $F_T$, is a function of the twist angle, $\phi$, and the fiber length, $L_T$, over which the twist is imposed.

Because the delivery fiber length may be about 10 m or more, the twist lens may be so strong that it cannot be compensated sufficiently by simply applying corrective optics at either end of beam-delivery fiber 10, 11. Thus, in some embodiments, the twist in the beam-delivery fiber may only occur at predetermined locations along the total fiber length. For example, this may be achieved using an optical fiber twist module 100 that may be spliced into beam-delivery fiber 10, 11 at appropriate locations along beam-delivery fiber 10, 11.

Figure 9:
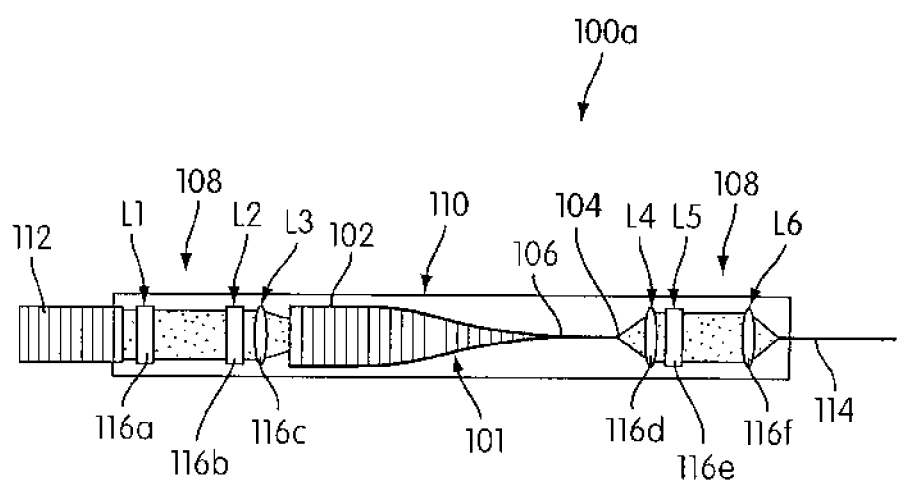
FIG. 9 is a schematic representation of an optical fiber module in accordance with an embodiment.

In the embodiment shown in FIG. 9, optical twist module 100 has optical fiber 101 having first end 102, second end 104, and twisted portion 106 between first and second ends 102, 104, wherein twisted portion 106 results in a distortion effect. Optical twist module 100 includes distortion compensation arrangement 108 to compensate for the distortion effect, and further includes housing 110 configured to house at least a portion of optical fiber 101 including twisted portion 106. In one embodiment, housing 110 is a hermetically sealed housing. First end 102 of fiber 101 is configured to be operatively connected to input fiber 112, and second end 104 is configured to be operatively connected to output fiber 114. In some embodiments, input and output fibers 112, 114 may be integral with fiber 101. In other embodiments, input and output fibers 112, 114 and fiber 101 may be separated pieces operatively connected to one another. It is contemplated that fibers 101, 112, and/or 114 may be either HARC or SHARC fibers.

In the embodiment of FIG. 9, distortion compensation arrangement 108 comprises a lens arrangement configured to compensate for the distortion effect resulting from twisted portion 106. For a twist angle of about 90 degrees, according to FIG. 8 and equation (6), the twist-lens focal length should be about half of the length of the twisted region of the fiber. Therefore, compensation for the twist lens may be achieved by using one or more free-space cylindrical lenses. Cylindrical lenses may be used for free-space coupling of a circular beam into a planar waveguide, which is located at a focus or image plane of the lens.

In one embodiment, the twist module 100 includes the distortion compensation arrangement 108 that includes a series combination of cylindrical lenses 116a-116f, and also optionally at least one polarization component (not shown) at either the input end, the output end, or both ends. Lenses 116a-116f may by conventional refractive lenses, although other types of lenses, such as planar GRIN lenses may also be used. Lenses 116a-116f and fiber 101 may be contained within housing 110 having input fiber 112 and output fiber 114 on either end thereof. Module 100 may be implemented in a manner analogous to a variety of telecommunication components, such as, for example, isolators or dielectric filters, all of which embody free-space components contained within a module having fiber pigtails that allow the module to be simply spliced into the fiber-based system. Specifically, module 100 contains input and output fibers 112, 114, respectively on either end that enable these components to be spliced into a fiber-based system. The module 100 may be designed to maintain optical alignment among the optical elements over a range of environmental conditions.

Input end of input fiber 112 may be spliced into an incoming HARC or SHARC fiber (not shown in FIG. 9) and output end of output fiber 114 may be spliced into an outgoing HARC or SHARC fiber (not shown in FIG. 9). Cylindrical lenses 116a, 116b may be configured to collimate the beam and direct the beam into twisted portion 106 of fiber 101. The wide dimensions of the fiber may be sufficiently large such that essentially no diffractive spreading occurs in this dimension. However, it is contemplated that an additional lens may be provided to collimate the beam in the slow-axis direction. Lens 116c may be configured to converge the beam in the slow-axis direction as a "pre-distortion" to at least partially compensate the planar negative twist lens resulting from twisted portion 106 of the fiber 101. As shown in FIG. 9, after the 90 degree twist in twisted portion 106, the slow axis direction of fiber 101 is perpendicular to the slow-axis direction of fiber 101 before twisted portion 106. Lens 116d may be configured to complete the compensation of the twist lens by imaging the beam in the slow-axis direction into output fiber 114. Lenses 116e, 116f may be configured to collimate the beam in the fast-axis direction and direct the beam into output fiber 114, which may then be spliced to another HARC delivery fiber (not shown in FIG. 9). As mentioned above, lens 116a-116f, fiber 101 with twisted portion 106, and portions of input and output fibers 112, 114 may be contained within housing 110.

In another embodiment, optical fiber twist module 100 (see FIG. 10) may employ an all-fiber or all-glass module in which the optical beam does not leave the fiber medium until the beam reaches the output end of fiber 114 (not shown in FIG. 10), where it transitions into free space or is spliced to another fiber, which may be a HARC or SHARC fiber.

Although fiber 101 and input and output ends of fibers 112, 114 are not shown in FIG. 10, it should be appreciated that module 100 includes such features contained within housing 110. In such embodiments, fiber 101 and input and output ends 112, 114 may all be an integral length of a single fiber. In such embodiments, rather than using the free-space lens arrangement described above, module 100 may include other forms of distortion compensation arrangements. The compensation arrangements or methods are based on the fact that the twist lens operates optically as an effective negative 1-D gradient-index (GRIN) lens with a focal distance dependent on both the length of the twisted region and the angle of twist. Thus, in one embodiment, the distortion compensation arrangement includes a positive GRIN lens effect that has an opposite and substantially equal lens power to a power of the negative GRIN lens effect arising from twisted portion 106. That is, a compensation arrangement may include building into the core of the twisted region a positive GRIN lens having an equal and opposite lens power to the power of the negative lens originating from the twisted portion of the fiber. In one embodiment, the positive lens effect is created by producing a slow-axis refractive index variation into the core, as is usually done to produce commercial 2-D GRIN lenses. Alternatively or additionally, a positive lens effect may be created by profiling the core thickness of fiber 101 along the slow-axis direction, making the core thicker at the middle, along the fiber axis, and narrower near the edges.

Either one of the built-in GRIN lens compensation arrangements described above may be used, and in one embodiment, module 100 may also include an end mount arrangement including end mounts 120, 122 that may be used to adjust a length of twisted portion 106. End mounts 120, 122 may be used to fine tune the compensation of the twist lens to reduce or eliminate any residual lens power, either from twisted portion 106 or the compensation arrangement used in module 100. As shown by equation (6), for a given twist angle, the twist lens can be tuned by varying the twist length. Thus, in an embodiment having module 100 that includes a 90 degree twisted portion over a length L, adjustments may be made to module 100 during assembly to eliminate any net optical distortion.

In the embodiment shown in FIG. 10, end mounts 120, 122 are each provided with slots 124 constructed and arranged to have a similar thickness and width as the thin dimension of fiber 101. At least portions of fiber 101 are contained in the slots 124. Housing 110, which takes the form of a tube in this embodiment, includes longitudinal slots 126 and 127 provided therein. In one embodiment, slot 126 runs the entire length of the housing. One function of slot 126 is to allow the fiber to be inserted into the housing from the side. Slots 127 (some not shown in this perspective drawing) are several times longer than the length of the end mounts 120, 122. Slots 126 and 127 are constructed and arranged to receive flanges 128 of end mounts 120, 122 when end mounts 120, 122 are connected to housing 110. In one embodiment, end mounts 120, 122 are rotated 90 degrees with respect to each other and then placed into slots 126 on first end 130 and second end 132, respectively, of housing 110. Slots 126 and 127 may be constructed and arranged to be longer than the lengths of end mounts 120, 122, thus enabling end mounts 120, 122 to slide longitudinally along housing 110 and thereby to vary the spacing between end mounts 120, 122. By varying the spacing between end mounts 120, 122, the twist length, and thus, the strength of the twist lens, may be adjusted while maintaining a constant twist angle. A reference optical beam may be launched into module 100, and the transmitted beam quality may be monitored to determine whether any evidence of a twist lens remains. If a distortion is detected, the twist length may be adjusted by adjusting the spacing between end mounts 120, 122. The transmitted beam quality may be continuously monitored while end mounts 120, 122 are adjusted to adjust the twist length so as to eliminate or reduce any net optical distortion in the reference beam.

In another embodiment, module 100 may be constructed and arranged to enable in-situ length adjustment. In such embodiments, a threaded or sliding feature may be added to housing 110 and end mounts 120, 122 to enable final optimal adjustments during end-to-end testing, after final system integration of the beam-delivery fiber system. One implementation would be to take advantage of the compliance inherent in the housing 110 by virtue of slot 126 and use small band clamps to squeeze housing 110 onto end mounts 120 and 122 similar to a standard collet clamp found in machine shops. This would allow final alignment after installation and provide a relatively simple method to fix the position, either permanently or for repeated adjustments.

In yet another embodiment, the optical fiber module may be divided into three sections (first, second, and third sections) having lengths $L_1$, $L_2$, and $L_3$, respectively. The first and third sections may each include a 45 degree twisted portion of fiber, which added together equals a 90 degree twisted portion. In such embodiment, the distortion compensation arrangement may include one of the two all-glass distortion compensation methods and arrangements described above. However, because of the fabrication tolerances, the compensation may not be sufficient and distortion may remain. By adjusting twist lengths $L_1$ and $L_3$, the twist lens at the two ends may vary while the twist angles remains constant. Thus, a reference laser beam may be launched into the module and the transmitted beam quality may be monitored to determine if there is any residual twist lensing. If distortion is detected, twist lengths $L_1$ and $L_3$ may be adjusted while the beam quality is continuously monitored to determine twist length $L_1$ and $L_3$ values that can reduce or eliminate any net optical distortion in the reference beam.

In yet another embodiment, the optical fiber twist module may be divided into three sections (first, second, and third sections) having lengths $L_1$, $L_2$, and $L_3$, respectively. The first and third sections may each initially include a 45 degree twisted portion of fiber, which added together equals a 90 degree twisted portion. However, in this embodiment, the distortion compensation arrangement may be configured to overcompensate for the distortion resulting from the twisted portions. This over-compensation may be eliminated by providing an additional twist in the second section, increasing it above 45 degrees. A reference beam may be launched into the module and the transmitted beam quality may be monitored while a twist having a selected angle is provided in the second section. Thus, the twist in the second section may be adjusted while monitoring the transmitted beam quality to determine the sufficient twist in the second section that eliminates or reduces the net distortion. It should be appreciated that as the fiber in the second section is twisted, the opposite ends of the fiber optic module should be securely held or fixed to ensure that the twist angle in the third section is less than 45 degrees and complementary to the twist angle in the first section.

In the above-described embodiments, once a twist module has been adjusted such that the net distortion has been reduced or eliminated, a mechanical structure may be used to permanently hold all the length and twist values fixed, such that the compensation does not change during use of the module. In one embodiment, the end mounts 120 and 122 can be, for example, bonded to housing 100 so as to permanently fix the compensation to the optimal aligned state. Accordingly, the modules may be ready for use when needed in a fiber-based system.

The data and the model plotted in FIG. 8 do not account for any distortions other than the linear stretch of the core edges under the influence of the twisted portions. Thus, for the twist angles applied in the experiments that resulted in the data plotted in FIG. 8, there were no distortions other than the simple GRIN lens. However, in at least some embodiments, and in at least some situations, the twist-lens resulting from larger twist angles include not only simple planar GRIN lens, but may also include polarization distortions. If such polarization distortions are generated, then they might be compensated by employing at least one polarization element to arrange for the polarization state of the beam exiting the twist module to be substantially the same as that of the input beam, but rotated by the twist angle. For example, it is well known in the art that the orientation of a linearly polarized beam can be rotated by an angle $2\theta$ by passing the beam through a half-wave plate with the optic axis of the wave plate making an angle $\theta$ relative to the initial polarization. In addition, a fractional wave plate can change linear polarization to elliptical polarization, or vice versa.

In some embodiments, and in some situations, the twist-lens resulting from larger twist angles may also include additional higher-order distortions. If such distortions are generated, then the twist length may be increased to produce a twist rate for which the higher-order distortion is reduced or eliminated. However, if the twist length exceeds a tolerable length for the module, then the overall twist may be divided into a series of smaller twists that add up to the total required twist, and the fiber may be folded between twists to provide a more compact module size. For example, if a 20 degree twist may be achieved without any extra distortions, then the 90 degree twist may be made from four 20 degree twists and a single 10 degree twist. Other alternatives may include five 18 degree twists, or six 15 degree twists. Accordingly, the modules may be divided into multiple number of sections and each section may include twisted portions that add up to the total required twist.

Figure 13:
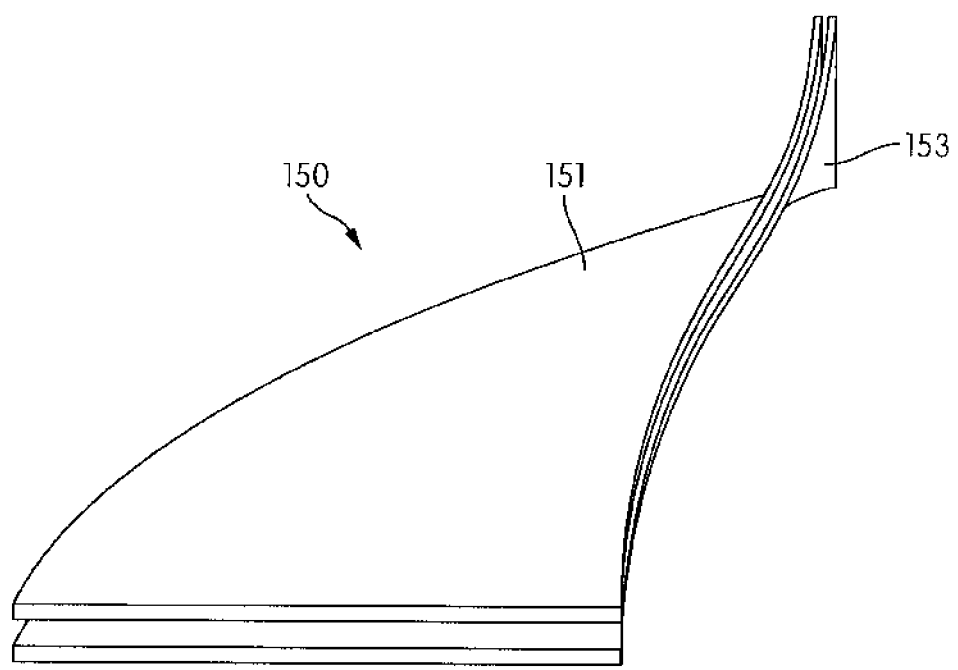
FIG. 13 is a schematic of a hollow-core waveguide having a 90° twist, which can be used as a twist module to interconnect two non-twisted glass HARC/SHARC fibers, according to an embodiment.

Yet another implementation of the twist mode includes a twisted hollow-core waveguide 150, as indicated in FIG. 13, instead of the twisted fiber 101. This approach avoids the higher-order distortions that might arise in a rectangular core made of glass or other solid material. The hollow waveguide can be made of two thin parallel flexible plates 151, 153 that reflect light propagating between them. The thin plates 151, 153 can be made of metal, bare glass, uncoated glass, metal-coated glass, or other material to transmit light with minor optical loss. This implementation offers several advantages. First of all, hollow waveguides are highly resistant to laser damage. The air or vacuum filling the space between the plates has a very high damage threshold, and the fact that the optical radiation is incident on the reflecting surfaces at a highly oblique angle of incidence leads to a high damage threshold for those surfaces as well. Second, the plates can be specified to be much wider than the propagating beam itself, thereby avoiding any reflections of the beam from the slow-axis edges of the guide. Third, the thin plates 151, 153 can be shaped in the slow-axis direction, thereby modifying the cross-section shape of the hollow core to be either concave or convex, and this design degree of freedom can be exploited for fine tuning the positive lensing that compensates the twist lens. The correctors 108 can be used to expand and collimate the beam size at the twist-module input, and to contract the beam again to match the slow-axis width of optical fiber at the module output end. In one embodiment, the hollow core dimensions may approximately match the respective core dimensions of the HARC input and output fibers. This configuration may allow the use of relatively simple interface optics with a magnification of ~1. However, if the hollow-core propagation losses are greater than can be tolerated, the beam may be expanded before it enters the hollow core to take advantage of the fact that the propagation loss of a waveguide scales inversely as the third power of the waveguide dimension. For example, doubling the fast-axis dimension reduces the propagation loss by a factor of eight.

Figure 12A:
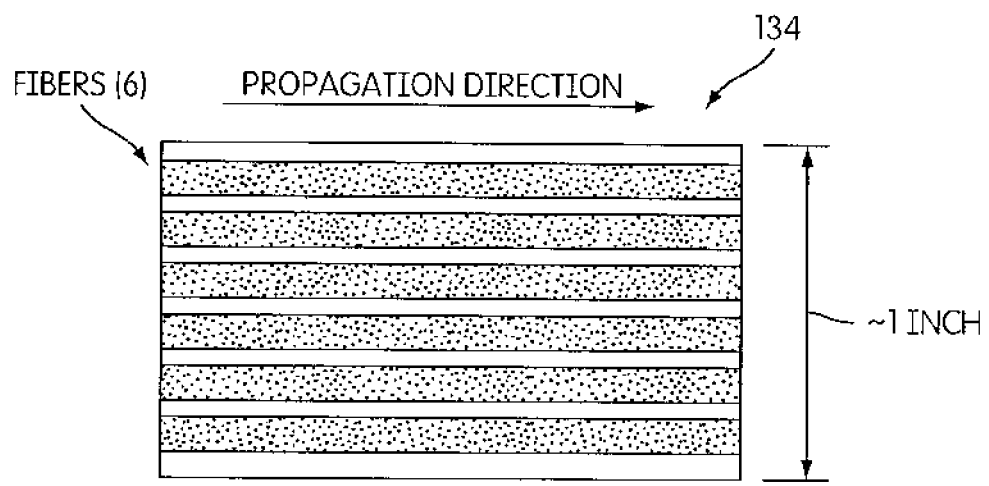
FIG. 12a is a side plan view of a portion of the fiber structure used in the rolling loop approach of FIGS. 11a-11c.
Figure 12B:
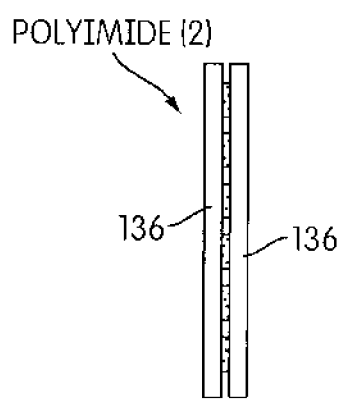

Some beam delivery systems have a portion that is rotatable relative to a stationary base. That is, fiber 10, 11 may be connected both to a stationary object and to a rotating object. In such situations, beam-delivery fiber 10, 11 should be able to transition from the stationary object to the rotating object without any twisting of beam-delivery fiber 10, 11. To prevent twisting of fiber 10, 11, fiber 10, 11 may be collated onto a flat tape-like structure to form optical fiber arrangement or structure 134, for example as shown in FIG. 12a. In the embodiment of FIG. 12a, six fibers are collated or arranged between two layers of polyimide 136 (see FIG. 12b). Additional layers may be added to strengthen fiber structure 134. It should also be appreciated that fewer layers may be provided in the fiber structure 134. For example, in some embodiments, the optical fiber arrangement structure 134 may include a single layer of fiber 10. The fibers in the center may be configured to minimize bending stress. Fiber structure 134 may be sufficiently flexible to provide a "rolling loop," which will be described in more detail later. This fiber structure 134 may also allow bending only about the fast-axis of the rectangular fiber to prevent unwanted twists in the fiber.

FIGS. 11a-11c show implementation of the "rolling loop" approach using fiber structure 134 or (S)HARC fiber 10, 11. For example, for the case of fiber structure 134, as shown in FIG. 11a, rotating curved inner portion 138 is provided concentric with fixed curved outer portion 140 of a beam director hardware. In the embodiment of FIG. 11a, the radius of the inner portion is 6 inches, and the radius of the outer portion is 12 inches. These radii may be varied to support any specific implementation, limited only by the degree to which the resulting bending stress induces losses and/or mode coupling in the fiber. The tolerance to such bend-induced loss and mode coupling establishes the minimum allowable bend radius in the "rolling loop" portion between the inner and outer housings and of the inner hub itself Fiber structure 134 is mechanically constrained between two concentric portions 138, 140. Fiber structure 134 may be connected to inner portion 138 at point A and may be connected to the outer loop at point B. Fiber structure 134 may include loop 142 formed therein between points A and B. The position of loop 142 may vary to maintain a constant length of fiber structure 134 between points A and B during rotation of inner portion 138. In one embodiment, fiber structure 134 has a length of 1 m between points A and B. In one embodiment, the system has an Azimuthal range of about ±150 degrees relative to a central line of sight (line C). FIG. 11a shows the "rolling loop" formed by fiber structure 134 accommodating a rotation of +150 degree Azimuth of inner portion 138 in the counterclockwise direction. As shown in FIG. 11a, the position of loop 142 moved about 50 degrees from the position shown in FIG. 11b to accommodate the rotation of the beam director. FIG. 11c shows the new position of loop 142 after loop 142 has moved −50 degrees from the position shown in FIG. 11b to accommodate the −150 degree Azimuth rotation of inner portion 138 in the clockwise direction from the position shown in FIG. 11b. Fiber structure 134 and the "rolling loop" approach using fiber structure 134 enables fiber 10 to accommodate rotational degree of freedom of the fiber without any twisting of fiber 10.

Fiber structure 134 enables the transitioning of fiber through the first rotational degree of freedom as mentioned above. After the transition using the "rolling loop" approach, optical fiber twist module 100 may be spliced into the beam-delivery fiber, which enables the beam-delivery fiber to accommodate any bending required in the second degree of freedom. Additional optical fiber modules 100 and/or other rolling loop configurations using fiber structure 134 may be provided in other sections of the fiber to accommodate additional rotation and/or bending. Although the above implementation is described while referring to fiber structure 134, a similar implementation can be provided for (S)HARC fiber 10, 11.

In the present disclosure, the term "optical fiber" is used broadly to encompass any fiber that is capable of transmitting or carrying radiation in any wavelength range including visible, ultraviolet and infrared. For example, the fiber can be made of fused silica but other fiber materials that offer the desired flexibility and desired transmission characteristics can be used. For example, a fiber can be made from chalcogenide materials that have the desired transmission characteristics in the mid-infrared wavelength range.

The above description has been provided for the purpose of illustration based on what are currently considered to be the most practical implementations, but it is to be understood that such detail is solely for that purpose, and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the inventive concept.

What is claimed:

1. An optical fiber, comprising:
   a core having a high aspect ratio elongated cross-section and having a first refractive index;
   first and second signal claddings positioned in contact with and sandwiching the core, the first and second signal claddings having a second refractive index; and
   a third cladding substantially surrounding at least slow-axis edges of the core, the third cladding having a third refractive index, the third cladding in contact with the slow-axis edges of the core;
   wherein the core is narrower in a fast-axis direction and wider in a slow-axis direction such that the fiber is mechanically flexible in the fast-axis direction and is mechanically rigid in the slow-axis direction.

2. The optical fiber of claim 1, wherein a difference between the first refractive index of the core and the third refractive index of the third cladding is less than about 500 ppm to provide a loss for any higher-order transverse electromagnetic modes that is greater than a loss for lower-order transverse electromagnetic modes so as to substantially remove the higher-order transverse electromagnetic modes along the slow-axis direction within the fiber.

3. The optical fiber of claim 1, wherein a width of the core along the slow-axis direction is selected so as to be greater than a width of a laser beam input into the fiber.

4. The optical fiber of claim 1, wherein a width of the core exceeds a width of a diffracted laser beam at an output end of the fiber.

5. An optical fiber, comprising:
a core having a high aspect ratio elongated cross-section and having a refractive index;
wherein the core is narrower in a fast-axis direction and wider in a slow-axis direction such that the fiber is mechanically flexible in the fast-axis direction and is mechanically rigid in the slow-axis direction; and
wherein a width $w_b$ of a laser beam input into the fiber is such that a Fresnel length $L_{Fr}$ that is proportional to $w_b^2 n/\lambda$ exceeds a fiber length L, where n is the refractive index of the core and $\lambda$ is a wavelength of the laser beam input into the fiber.

6. An optical fiber comprising:
a core having a high aspect ratio elongated cross-section and having a first refractive index;
first and second signal claddings positioned in contact with and sandwiching the core, the first and second signal claddings having a second refractive index; and
a third cladding substantially surrounding at least slow-axis edges of the core, the third cladding having a third refractive index;
wherein the core is narrower in a fast-axis direction and wider in a slow-axis direction such that the fiber is mechanically flexible in the fast-axis direction and is mechanically rigid in the slow-axis direction; and
wherein the third refractive index of the third cladding is selected so that a numerical aperture of the third cladding at an outside boundary surface is less than 0.06 so as to allow laser radiation leaking into the third cladding to leak out of the third cladding.

7. An optical fiber comprising:
a core having a high aspect ratio elongated cross-section and having a first refractive index;
first and second signal claddings positioned in contact with and sandwiching the core, the first and second signal claddings having a second refractive index;
a third cladding substantially surrounding at least slow-axis edges of the core, the third cladding having a third refractive index; and
a collar attached to the third cladding, wherein a fourth refractive index of the collar is essentially equal to the third refractive index of the third cladding;
wherein the core is narrower in a fast-axis direction and wider in a slow-axis direction such that the fiber is mechanically flexible in the fast-axis direction and is mechanically rigid in the slow-axis direction.

8. An optical fiber comprising:
a core having a high aspect ratio elongated cross-section and having a first refractive index;
first and second signal claddings positioned in contact with and sandwiching the core, the first and second signal claddings having a second refractive index;
a third cladding substantially surrounding at least slow-axis edges of the core, the third cladding having a third refractive index; and
a coating covering the third cladding, wherein the coating is configured to be transparent to laser radiation leaking into the third cladding;
wherein the core is narrower in a fast-axis direction and wider in a slow-axis direction such that the fiber is mechanically flexible in the fast-axis direction and is mechanically rigid in the slow-axis direction.

9. The optical fiber of claim 1, wherein the third cladding substantially surrounds the core and the first and second signal claddings.

10. The optical fiber of claim 1, wherein the fiber is configured to transmit a laser beam having a power greater than or equal to about 10 kW.

11. The optical fiber of claim 1, wherein the core has a substantially rectangular shape elongated in the slow-axis direction.

12. The optical fiber of claim 1, wherein the fiber has a substantially rectangular external shape elongated in the slow-axis direction so as to allow mechanical flexing in the fast-axis direction and to resist mechanical flexing in the slow-axis direction.

13. An optical fiber, comprising:
a core having a high aspect ratio elongated cross-section and having a refractive index; and
a twisted portion occurring over a fiber length near an output end of the fiber, wherein the fiber length near the output end of the fiber is shorter than a characteristic distortion length that is related to a twist-induced focal length;
wherein the core is narrower in a fast-axis direction and wider in a slow-axis direction such that the fiber is mechanically flexible in the fast-axis direction and is mechanically rigid in the slow-axis direction.

14. The optical fiber of claim 13, wherein:
the characteristic distortion length $L_{dist}$ is proportional to $w_{core}/\delta\theta_F$;
$\delta\theta_F = (w_b/2F)$ is a twist-induced divergence angle;
$w_{core}$ is a width of the core;
$w_b$ is a width of an input laser beam; and
$F = \delta L/\phi^2$ is the twist-induced focal length associated with a twisting angle $\phi$.

15. The optical fiber of claim 1, wherein a beam divergence is conserved from an input end of the fiber to an output end of the fiber.

16. An optical fiber, comprising:
a core having a high aspect ratio elongated cross-section and having a refractive index, wherein the core is narrower in a fast-axis direction and wider in a slow-axis direction such that the fiber is mechanically flexible in the fast-axis direction and is mechanically rigid in the slow-axis direction; and
a bent portion bent in the fast-axis direction and a twisted portion, wherein the twisted portion is distinct from the bent portion so as to maintain substantially a same beam quality throughout the fiber.

17. The optical fiber of claim 16, wherein the optical fiber further comprises:
first and second signal claddings positioned in contact with and sandwiching the core, the first and second signal claddings having a second refractive index; and
a third cladding substantially surrounding at least slow-axis edges of the core, the third cladding having a third refractive index.

18. An optical fiber, comprising:
a core having a high aspect ratio elongated cross-section and having a refractive index, wherein the core is narrower in a fast-axis direction and wider in a slow-axis direction such that the fiber is mechanically flexible in the fast-axis direction and is mechanically rigid in the slow-axis direction; and a twisted portion, wherein the twisted portion of the fiber induces an optical distortion within the fiber, and wherein the twisted portion is configured to compensate for the optical distortion, thereby yielding a transmitted beam in which no net optical distortion remains after passing through the twisted portion.

19. The optical fiber of claim 18, wherein:
the optical distortion is a negative lens within the fiber; and
the negative lens is compensated by building into the core of the twisted portion a positive lens having opposite and substantially equal lens power to a power of the negative lens.

20. The optical fiber of claim 18, wherein:
the optical distortion is a polarization distortion within the fiber; and
the polarization distortion is compensated using at least one polarization component.

21. The optical fiber of claim 19, wherein the positive lens comprises at least one of: a slow-axis refractive index variation in the core or a profiled thickness of the core along the slow-axis direction so as to make the core thicker at a middle along a fiber axis and narrower near edges of the core.

22. The optical fiber of claim 19, wherein a magnitude of the negative lens is tuned to cancel out the positive lens, thereby yielding the transmitted beam in which no net beam-quality distortion remains after passing through the twisted portion.

23. The optical fiber of claim 22, wherein the negative lens is tuned by varying a length of the twisted portion.

24. The optical fiber of claim 1, wherein onset of stimulated Raman scattering and onset of stimulated Brillouin scattering are controlled by selecting at least one of: a length of the fiber, an area of the core of the fiber, a power of laser radiation propagating within the fiber, or a medium dependent Raman gain.

25. An optical fiber, comprising:
a core having a high aspect ratio elongated cross-section and having a refractive index;
wherein the core is narrower in a fast-axis direction and wider in a slow-axis direction such that the fiber is mechanically flexible in the fast-axis direction and is mechanically rigid in the slow-axis direction; and
wherein, for a given power of laser radiation and for a given Raman gain, the core is configured with a sufficiently large area such that at least one of stimulated Raman scattering or stimulated Brillouin scattering is prevented from occurring at fiber lengths greater than approximately 2 meters.

26. An optical apparatus comprising:
a laser;
an optical fiber having an input end and an output end; and
an optical coupler configured to input radiation from the laser through the input end of the optical fiber;
the optical fiber comprising:
a core having a high aspect ratio elongated cross-section and having a first refractive index;
first and second signal claddings positioned in contact with and sandwiching the core, the first and second signal claddings having a second refractive index; and
a third cladding substantially surrounding at least slow-axis edges of the core, the third cladding having a third refractive index, the third cladding in contact with the slow-axis edges of the core;
wherein the core is narrower in a fast-axis direction and wider in a slow-axis direction such that the fiber is mechanically flexible in the fast-axis direction and is mechanically rigid in the slow-axis direction.

27. The optical apparatus of claim 26, wherein a difference between the first refractive index of the core and the third refractive index of the third cladding is less than about 500 ppm to provide a loss for any higher-order transverse electromagnetic modes that is greater than a loss for lower-order transverse electromagnetic modes so as to substantially remove the higher-order transverse electromagnetic modes along the slow-axis direction within the fiber.

28. An optical apparatus comprising:
a laser;
an optical fiber having an input end and an output end; and
an optical coupler configured to input radiation from the laser through the input end of the optical fiber;
the optical fiber comprising a core having a high aspect ratio elongated cross-section and having a refractive index;
wherein the core is narrower in a fast-axis direction and wider in a slow-axis direction such that the fiber is mechanically flexible in the fast-axis direction and is mechanically rigid in the slow-axis direction; and
wherein the laser includes a fiber laser and the optical coupler includes a planar gradient index (GRIN) lens having an index gradient, a plane of the index gradient substantially parallel to the slow-axis direction of the fiber, the optical coupler configured to couple the fiber laser to the input end of the optical fiber.

29. The optical apparatus of claim 28, wherein a length of the optical coupler is selected to be approximately equal to a quarter-pitch length of the GRIN lens.

30. The optical apparatus of claim 26, wherein the laser and the optical fiber are attached to opposite ends of the optical coupler to form a monolithic device.

31. The optical apparatus of claim 26, wherein the laser and the optical fiber are attached to opposite ends of the optical coupler using fusion splicing.

32. The optical apparatus of claim 26, wherein the optical coupler is configured to reformat a beam of the laser into a collimated high-aspect ratio elliptical beam for input to the optical fiber.

33. The optical apparatus of claim 26, wherein the optical coupler comprises at least one free-space lens configured to direct the radiation from the laser into the optical fiber.

34. An optical apparatus comprising:
an optical fiber having an input end and an output end; and
a first end cap connected to the output end of the optical fiber;
the optical fiber comprising:
a core having a high aspect ratio elongated cross-section and having a first refractive index;
first and second signal claddings positioned in contact with and sandwiching the core, the first and second signal claddings having a second refractive index; and
a third cladding substantially surrounding at least slow-axis edges of the core, the third cladding having a third refractive index, the third cladding in contact with the slow-axis edges of the core;
wherein the core is narrower in a fast-axis direction and wider in a slow-axis direction such that the fiber is mechanically flexible in the fast-axis direction and is mechanically rigid in the slow-axis direction.

35. An optical apparatus comprising:
an optical fiber having an input end and an output end; and
an end cap connected to the output end of the optical fiber;
the optical fiber comprising:
a core having a high aspect ratio elongated cross-section and having a refractive index,
wherein the core is narrower in a fast-axis direction and wider in a slow-axis direction such that the fiber is mechanically flexible in the fast-axis direction and is mechanically rigid in the slow-axis direction; and
wherein the end cap comprises an exit surface through which a laser beam input through the input end exits the end cap, the exit surface positioned at a location relative to the output end of the optical fiber where a laser beam size in the fast-axis direction is substantially equal to a laser beam size in the slow-axis direction.

36. The optical apparatus of claim 35, wherein the exit surface of the end cap is shaped so as to reduce a divergence of the laser beam along the fast-axis direction to a divergence of the laser beam along the slow-axis direction without changing the divergence of the laser beam along the slow-axis direction.

37. The optical apparatus of claim 36, wherein the divergence of the laser beam along the fast-axis direction is substantially equal to the divergence of the laser beam along the slow-axis direction.

38. The optical apparatus of claim 34, further comprising a second end cap connected to the input end of the optical fiber, wherein the second end cap is configured to receive a laser beam.

39. A method for fiber delivery of high power laser beams, the method comprising:
launching a laser beam into a fiber including:
a core having a high aspect ratio elongated cross-section and having a first refractive index;
first and second signal claddings positioned in contact with and sandwiching the core, the first and second signal claddings having a second refractive index; and
a third cladding substantially surrounding at least slow-axis edges of the core, the third cladding having a third refractive index, the third cladding in contact with the slow-axis edges of the core;
wherein the core is narrower in a fast-axis direction and wider in a slow-axis direction such that the fiber is mechanically flexible in the fast-axis direction and is mechanically rigid in the slow-axis direction; and
wherein the laser beam has a width smaller than a width of the core along the slow-axis direction; and
propagating the laser beam through the fiber while avoiding onset of at least one of: stimulated Raman Scattering or stimulated Brillouin Scattering.

40. The method of claim 39, further comprising delivering the laser beam to a desired location by at least one of bending or twisting the fiber along at least a portion of the fiber.

41. The method of claim 40, wherein at least one of bending or twisting the fiber comprises bending a first portion of the fiber and twisting a second portion of the fiber distinct from the first portion so as to maintain substantially a same beam quality throughout the fiber.

42. The method of claim 41, further comprising compensating an optical distortion within the second portion of the fiber induced by the twisting of the second portion of the fiber, thereby yielding a transmitted beam in which no net optical distortion remains after passing through the twisted portion.

43. The method of claim 42, wherein compensating the optical distortion comprises compensating a negative lens within the fiber by building, into the core of the twisted portion, a positive lens having opposite and substantially equal lens power as that of a lens power of the negative lens.

44. The method of claim 43, further comprising tuning a magnitude of the negative lens to cancel out the positive lens, thereby yielding the transmitted beam in which essentially no net beam-quality distortion remains after passing through the twisted second portion.

45. The method of claim 44, wherein tuning the negative lens comprises varying a length of the twisted second portion.

46. A method for fiber delivery of high power laser beams, the method comprising:
launching a laser beam into a fiber including:
a core having a high aspect ratio elongated cross-section and having a first refractive index;
first and second signal claddings positioned in contact with and sandwiching the core, the first and second signal claddings having a second refractive index; and
a third cladding substantially surrounding at least slow-axis edges of the core, the third cladding having a third refractive index, the third cladding in contact with the slow-axis edges of the core;
wherein the core is narrower in a fast-axis direction and wider in a slow-axis direction such that the fiber is mechanically flexible in the fast-axis direction and is mechanically rigid in the slow-axis direction; and
wherein the laser beam has a width smaller than a width of the core along the slow-axis direction; and
propagating the laser beam through the fiber to provide a loss for any higher-order transverse electromagnetic modes that is greater than a loss for lower-order transverse electromagnetic modes so as to substantially remove the higher-order transverse electromagnetic modes along the slow-axis direction within the fiber while reducing onset of at least one of stimulated Raman Scattering or stimulated Brillouin Scattering.

47. The method of claim 46, further comprising delivering the laser beam to a desired location by at least one of bending or twisting the fiber along at least a portion of the fiber.

48. The method of claim 47, wherein at least one of bending or twisting the fiber comprises bending a first portion of the fiber and twisting a second portion of the fiber distinct from the first portion so as to maintain substantially a same beam quality throughout the fiber.

49. The method of claim 48, further comprising compensating an optical distortion within the second portion of the fiber induced by the twisting of the second portion of the fiber, thereby yielding a transmitted beam in which no net optical distortion remains after passing through the twisted portion.

50. The method of claim 49, wherein compensating the optical distortion comprises compensating a negative lens within the fiber by building, into the core of the twisted portion, a positive lens having opposite and substantially equal lens power as that of a lens power of the negative lens.

51. The method of claim 50, further comprising tuning a magnitude of the negative lens to cancel out the positive lens, thereby yielding the transmitted beam in which essentially no net beam-quality distortion remains after passing through the twisted second portion.

52. The method of claim 51, wherein tuning the negative lens comprises varying a length of the twisted second portion.

53. The optical apparatus of claim 26, wherein the third cladding is in contact with substantially all of the slow-axis edges of the core.

54. The optical fiber of claim 1, wherein the third cladding is in contact with substantially all of the slow-axis edges of the core.

* * * * *